US008975084B2

(12) United States Patent
Qian et al.

(10) Patent No.: US 8,975,084 B2
(45) Date of Patent: Mar. 10, 2015

(54) DETERMINATION OF CORES OR BUILDING BLOCKS AND RECONSTRUCTION OF PARENT MOLECULES IN HEAVY PETROLEUMS AND OTHER HYDROCARBON RESOURCES

(75) Inventors: Kuangnan Qian, Skillman, NJ (US); Kathleen E. Edwards, Freehold, NJ (US); Anthony S. Mennito, Flemington, NJ (US); Howard Freund, Neshanic Station, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 490 days.

(21) Appl. No.: 13/167,841

(22) Filed: Jun. 24, 2011

(65) Prior Publication Data

US 2012/0156798 A1 Jun. 21, 2012

Related U.S. Application Data

(60) Provisional application No. 61/423,788, filed on Dec. 16, 2010.

(51) Int. Cl.
*G01N 24/00* (2006.01)
*H01J 49/00* (2006.01)

(52) U.S. Cl.
CPC .................................. *H01J 49/0045* (2013.01)
USPC .......................................................... 436/173

(58) Field of Classification Search
None
See application file for complete search history.

(56) References Cited

PUBLICATIONS

Li, X. et al. Examining the collision-induced decomposition spectra of ammoniated triglycerides as a function of fatty acid chain length and degree of unsaturation. II. The PXP/YPY series, 2006, Rapid Communications in Mass Spectrometry, vol. 20, pp. 171-177.*
Wadsworth, P.A., et al, Pinipoint hydrocarbon types, 1992, May 1992 Hydrocarbon Processing, Gulf Publishing Company.*
Porter et al., "Analysis of Petroleum Resins Using Electrospray Ionization Tandem Mass Spectrometry", Energy & Fuels, vol. 18, No. 4, Jul. 1, 2004, pp. 987-994.
McKenna et al., "Heavy Petroleum Composition. 1. Exhaustive Compositional Analysis of Athabasca Bitumen HVGO Distillates by Fourier Transform Ion Cyclotron Resonance Mass Spectrometry: A Definitive Test of the Boduszynski Model", Energy & Fuels, vol. 24, No. 5, May 20, 2010, pp. 2929-2938.
Verstraete et al., "Molecular Reconstruction of Heavy Petroleum Residue Fractions", Chemical Engineering Science, vol. 65, No. 1, Jan. 1, 2010, pp. 304-312.
Roussis, "Automated Tandem Mass Spectrometry by Orthogonal Acceleration TOF Data Acquisition and Simultaneous Magnet Scanning for the Characterization of Petroleum Mixtures", Analytical Chemistry, vol. 73, No. 15, Aug. 1, 2000, pp. 3611-3623.
Marshall et al., "Petroleomics: The Next Grand Challenge for Chemical Analysis", Accounts of Chemical Research, vol. 37, No. 1, Jun. 12, 2003, pp. 53-59.
Jaffe et al., "Extension of Structure-Oriented Lumping to Vacuum Residua", Industrial & Engineering Chemistry Research, vol. 44, No. 26, Dec. 1, 2005, pp. 9840-9852.
PCT International Search Report issued Jun. 21, 2012 in corresponding PCT Application No. PCT/US2011/063860, 5 pages.
PCT Written Opinion issued Jun. 21, 2012 in corresponding PCT Application No. PCT/US2011/063860, 7 pages.

* cited by examiner

*Primary Examiner* — Robert Xu
(74) *Attorney, Agent, or Firm* — Glenn T. Barrett; Malcolm D. Keen

(57) ABSTRACT

A method for the determination of the aromatic cores or building blocks of a vacuum resid by controlled fragmentation. Molecules can be generated from these building blocks.

20 Claims, 47 Drawing Sheets

USE OF CID TO DIFFERENTIATE SINGLE VERSUS MULTI-CORE STRUCTURES $C_{58}H_{68}S_2$

MW 810 g/mol

FIGURE 1. SINGLE VERSUS MULTI-CORE STRUCTURES

FIGURE 2 USE OF CID TO DIFFERENTIATE SINGLE VERSUS MULTI-CORE STRUCTURES

FIGURE 3 COLLISIONAL ACTIVATION AND UNIMOLECULAR ION DISSOCIATION

FIGURE 4 CID OF DI-C16-ALKYL NAPHTHALENE

FIGURE 5 ENERGY BREAKDOWN CURVE OF DI-C16-ALKYL NAPHTHALENE

FIGURE 6 CID OF DI-C16-ALKYL DIBENZOTHIOPHENE

FIGURE 7 ENERGY BREAKDOWN CURVE OF D-C16-ALKYL DIBENZOTHIOPHENE

FIGURE 8 CID OF BINAPHTHYL TETRADECANE

FIGURE 9 CID OF NAPHTHALENE-C14-PYRENE

FIGURE 10 CID OF DBT-C14-PHENATHRENE

FIGURE 11 CID OF CARBAZOLE-C14-PHENANTHRENE

FIGURE 12 CID OF C22 ALKYLATED P-DI-TOLYL METHANE

FIGURE 13 C22 ALKYLATED DI-PHENYL SULFIDE

FIGURE 14 C22 ALKYLATED DI-NAPHTHYL ETHANE

FIGURE 15 C26 DIAROMATIC STERANE

FIGURE 16 ENERGY BREAKDOWN CURVE OF C26 DIAROMATIC STERANE

FIGURE 17 REPEATABILITY OF DOBA ARC4+ CID-FTICR-MS SPECTRA

FIGURE 18 CID OF DOBA ARC4+ FRACTION SHOWED REDUCTION IN BOTH MOLECULAR WEIGHT AND Z-NUMBER, INDICATING THE PRESENCE OF MULTI-CORE STRUCTURES IN VAC RESID

FIGURE 19 DE-ALKYLATION AND MULTI-CORE STRUCTURE BREAKDOWN ILLUSTRATED BY CID OF DOBA ARC FRACTIONS. X-AXIS IS MOLECULAR WEIGHT. Y-AXIS IS Z-NUMBER. THE ABUNDANCES OF MOLECULES ARE INDICATED BY THE GREY SCALE.

FIGURE 20 Z-DISTRIBUTION OF HYDROCARBONS IN DOBA VGO AND VR ARC1 FRACTIONS BEFORE AND AFTER CID

FIGURE 21 Z-DISTRIBUTION OF HYDROCARBONS IN DOBA VGO AND VR ARC2 FRACTIONS BEFORE AND AFTER CID

FIGURE 22 Z-DISTRIBUTION OF HYDROCARBONS IN DOBA VGO AND VR ARC3 FRACTIONS BEFORE AND AFTER CID

FIGURE 23 Z-DISTRIBUTION OF HYDROCARBONS IN DOBA VGO AND VR ARC4+ FRACTIONS BEFORE AND AFTER CID

FIGURE 24 Z-DISTRIBUTION OF 1N COMPOUNDS IN DOBA VGO AND VR SULFIDES FRACTIONS BEFORE AND AFTER CID

FIGURE 25 Z-DISTRIBUTION OF HYDROCARBONS AND 1S COMPOUNDS IN MAYA VGO AND VR ARC1 FRACTIONS AFTER CID

FIGURE 26 Z-DISTRIBUTION OF HYDROCARBONS AND 1S COMPOUNDS IN MAYA VGO AND VR ARC2 FRACTIONS AFTER CID

FIGURE 27 Z-DISTRIBUTION OF HYDROCARBONS,1 AND 2S COMPOUNDS IN MAYA VGO AND VR ARC3 FRACTIONS AFTER CID

FIGURE 28 Z-DISTRIBUTION OF HYDROCARBONS,1 AND 2S COMPOUNDS IN MAYA VGO AND VR ARC4+ FRACTIONS AFTER CID

FIGURE 29 Z-DISTRIBUTION OF HYDROCARBONS,1S AND 1N COMPOUNDS IN MAYA VGO AND VR SULFIDES FRACTIONS AFTER CID

FIGURE 30 MOLECULAR WEIGHT DISTRIBUTION OF BASRAH VR ASPHALTENE BEFORE AND AFTER CID

FIGURE 31 OF COMPOUND CLASSES OF BASRAH VR ASPHALTENE BEFORE AND AFTER CID

FIGURE 32 OF Z-DISTRIBUTION OF BASRAH VR ASPHALTENE BEFORE AND AFTER CID

Overview of HC and 1S Cores

FIGURE 33 HYDROCARBON AND 1S CORES OBSERVED IN ASPHALTENE

Overview of 2S and 3S Cores

FIGURE 34 2S AND 3S CORES OBSERVED IN ASPHALTENE

FIGURE 35 A COMPARISON OF DAO Z-DISTRIBUTIONS BY CID-FTICR-MS AND BY MCR-MHA

FIGURE 36 COMPARISON OF ASPHALTENE Z-DISTRIBUTIONS BY CID-FTICR-MS AND BY MCR-MHA

FIGURE 37
1 4 0
2 100 0
3 1 -2
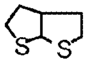
4 1 -2
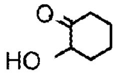
5 6 -2
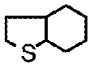
6 61 -2
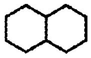
7 1 -4
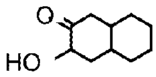
8 40 -4
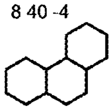
9 9 -4
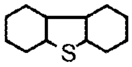
10 1 -5
11 1 -6
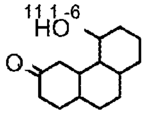
12 6 -6
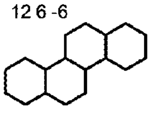
13 3 -6
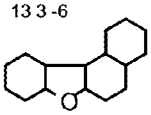
14 5 -6
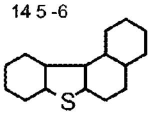
15 32 -6
16 2 -6
17 1 -6
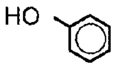
18 2 -7
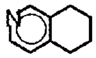
19 1 -8
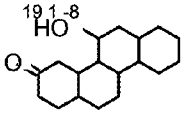
20 2 -8
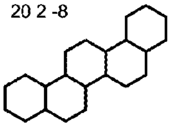
21 2 -8
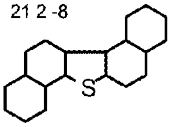
22 3 -8
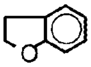
23 10 -8
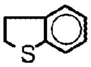
24 22 -8
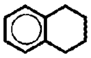
25 1 -8
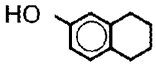
26 2 -9
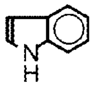
27 2 -9
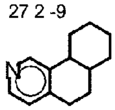
28 2 -10
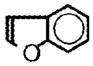
29 30 -10
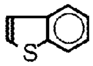
30 1 -10
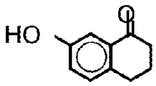
31 16 -10
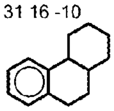
32 2 -10
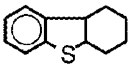

FIGURE 37b
33 1 -10
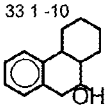
34 5 -11
35 1 -12
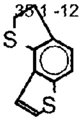
36 1 -12
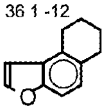
37 11 -12
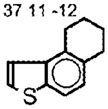
38 1 -12
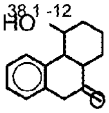
39 9 -12
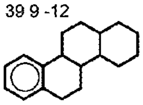
40 2 -12
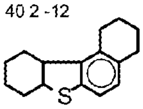
41 19 -12
42 1 -12
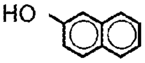
43 3 -13
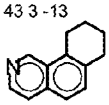
44 3 -14
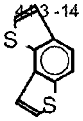
45 1 -14
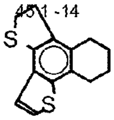
46 1 -14
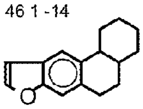
47 6 -14
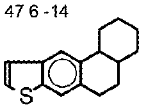
48 1 -14
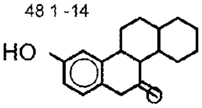
49 7 -14
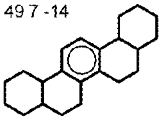
50 1 -14
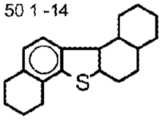
51 2 -14
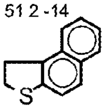
52 13 -14
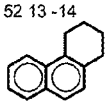
53 1 -14
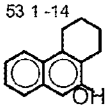
54 2 -15
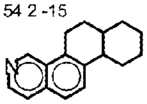
55 6 -15
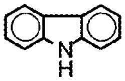
56 2 -16
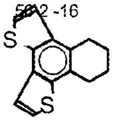
57 1 -16
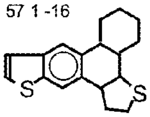
58 1 -16
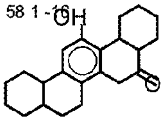

FIGURE 37c
59 12 -16
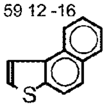
60 1 -16
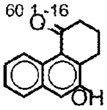
61 9 -16
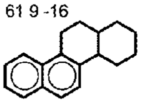
62 2 -16
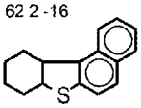
63 3 -16
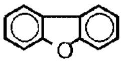
64 1 -16
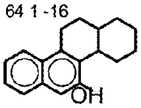
65 2 -17
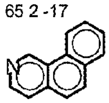
66 4 -17
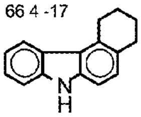
67 1 -18
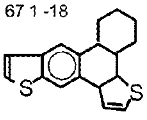
68 1 -18
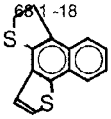
69 7 -18
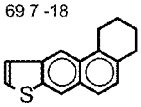
70 1 -18
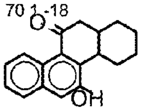
71 5 -18
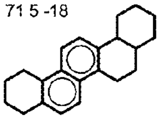
72 2 -18
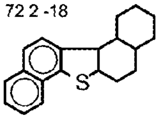
73 6 -18
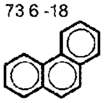
74 2 -18
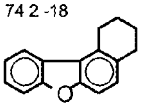
75 1 -18
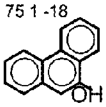
76 1 -19
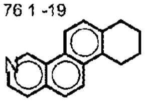
77 2 -19
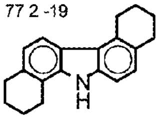
78 6 -20
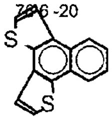
79 1 -20
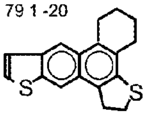
80 1 -20
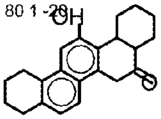
81 4 -20
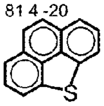
82 2 -20
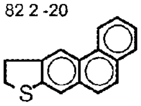
83 10 -20
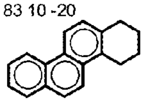

FIGURE 37d
84 2 -20
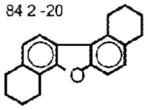
85 4 -20
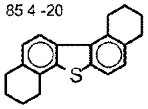
86 1 -20
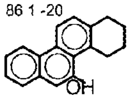
87 2 -21
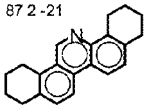
88 2 -21
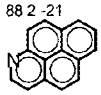
89 7 -21
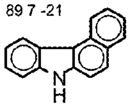
90 3 -22
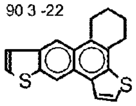
91 1 -22
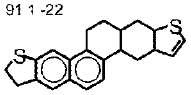
92 9 -22
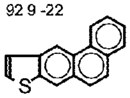
93 1 -22
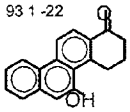
94 1 -22
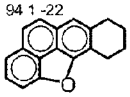
95 7 -22
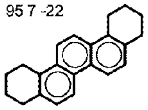
96 2 -22
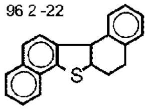
97 5 -22
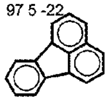
98 2 -22
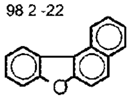
99 1 -22
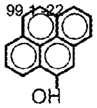
100 2 -23
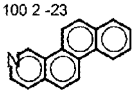
101 6 -23
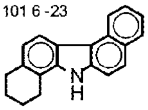
102 3 -24
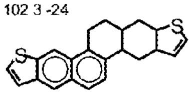
103 1 -24
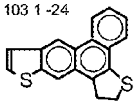
104 7 -24
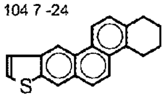
105 1 -24
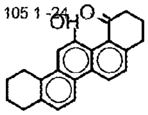
106 1 -24
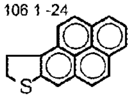
107 8 -24
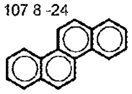

FIGURE 37e
108 2 -24
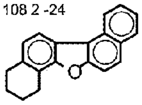
109 1 -24
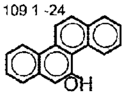
110 6 -25
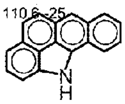
111 3 -25
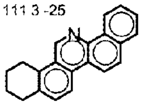
112 1 -26
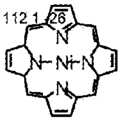
113 1 -26
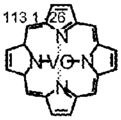
114 4 -26
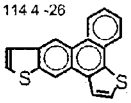
115 1 -26
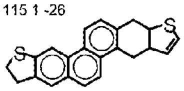
116 1 -26
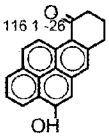
117 2 -26
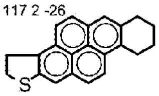
118 1 -26
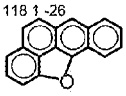
119 5 -26
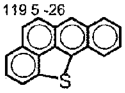
120 8 -26
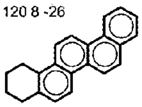
121 1 -26
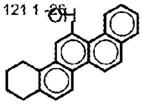
122 6 -27
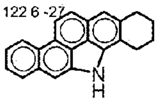
123 3 -27
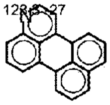
124 3 -28
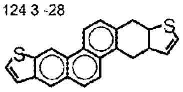
125 4 -28
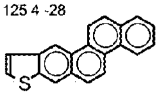
126 5 -28
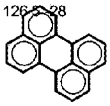
127 2 -28
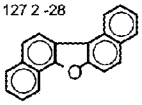
128 1 -28
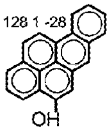
129 2 -29
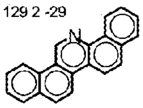

FIGURE 37f
130 4 -29
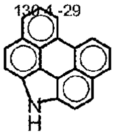
131 3 -30
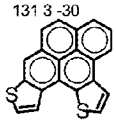
132 4 -30
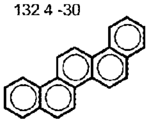
133 2 -30
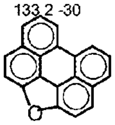
134 4 -30
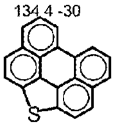
135 1 -30
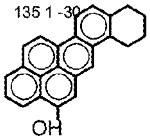
136 4 -31
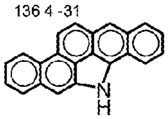
137 3 -32
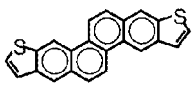
138 5 -32
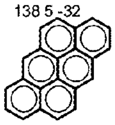
139 2 -32
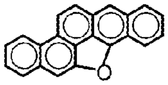
140 4 -32
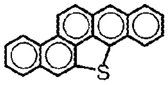
141 1 -32
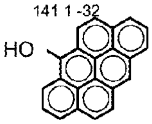
142 3 -33
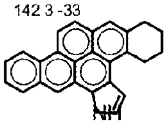
143 1 -34
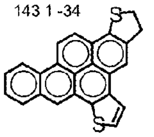
144 2 -34
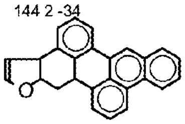
145 3 -34
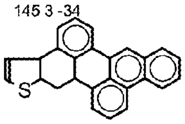
146 4 -34
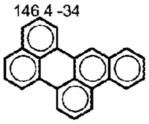
147 1 -34
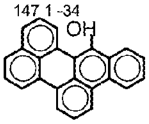
148 3 -35
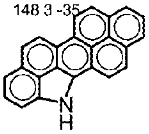
149 1 -36
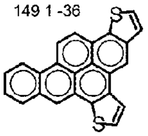
150 1 -36
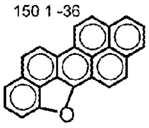

FIGURE 37g
151 1 -36
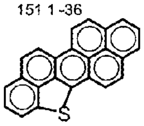
152 4 -36
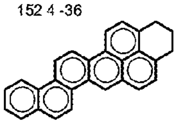
153 1 -36
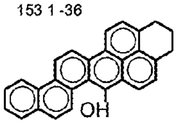
154 2 -37
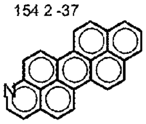
155 1 -38
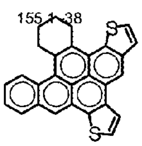
156 1 -38
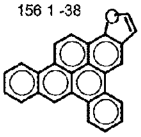
157 1 -38
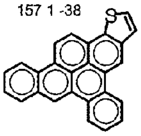
158 1 -38
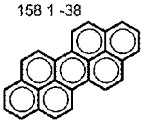
159 1 -38
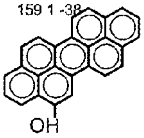
160 1 -39
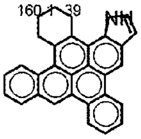
161 1 -40
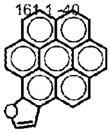
162 1 -40
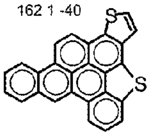
163 1 -40
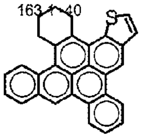
164 1 -40
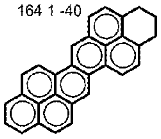
165 1 -40
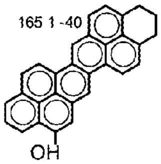
166 1 -41
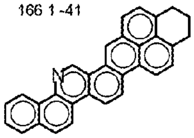
167 1 -42
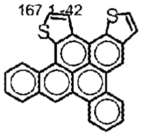
168 1 -42
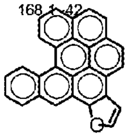

FIGURE 37h
169 1 -42
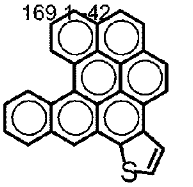
170 1 -42
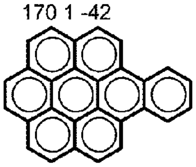
171 1 -42
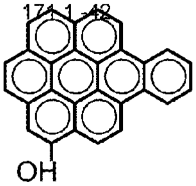
172 1 -43
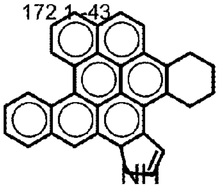
173 1 -44
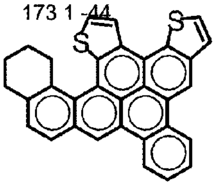
174 1 -44
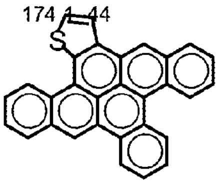
175 1 -44
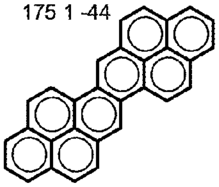
176 1 -45
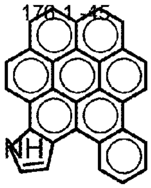
177 1 -46
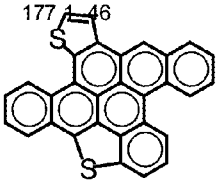
178 1 -46
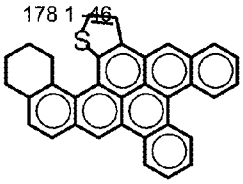
179 1 -46
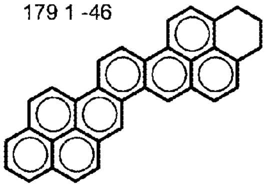

100 
61 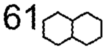
40 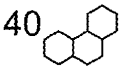
6 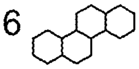
2 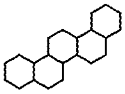
Figure 38. Saturate cores with their respective abundances.

DETERMINATION OF CORES OR BUILDING BLOCKS AND RECONSTRUCTION OF PARENT MOLECULES IN HEAVY PETROLEUMS AND OTHER HYDROCARBON RESOURCES

This is a Non-Provisional Application based on Provisional Application 61/423,788 filed Dec. 16, 2010.

BACKGROUND OF THE INVENTION

The present invention is a method for determining the cores or building blocks of a heavy hydrocarbon system. The invention also includes a method of generating parent molecules from the cores or building blocks. In a preferred embodiment, the heavy hydrocarbon is a vacuum resid. Cores or building blocks are defined as non-paraffinic molecular structures that are bridged by weak bonds that can be dissociated by the controlled fragmentation as described in this invention. Weak bonds include aliphatic carbon-carbon bonds and aliphatic carbon-heteroatom bonds. Examples of cores and building blocks are shown in FIGS. 37 and 38.

Petroleum oils and high-boiling petroleum oil fractions are composed of many members of relatively few homologous series of hydrocarbons [6]. The composition of the total mixture, in terms of elementary composition, does not vary a great deal, but small differences in composition can greatly affect the physical properties and the processing required to produce salable products. Petroleum is essentially a mixture of hydrocarbons, and even the non-hydrocarbon elements are generally present as components of complex molecules predominantly hydrocarbon in character, but containing small quantities of oxygen, sulfur, nitrogen, vanadium, nickel, and chromium. Therefore, in the present invention petroleum and hydrocarbon will be used interchangeably.

One way to obtain building block information is to perform detailed characterization of the vacuum gas oil (VGO) of the corresponding resid. There are a number of issues with this approach in addition to analytical cost and time required for detailed characterization. First of all, VGO molecules do not represent all cores existing in the resid. Certain larger aromatic cores (>6 aromatic rings) and multi-heteroatom molecules cannot be found in VGO. Secondly, the building block distribution of resid may not be the same as that in VGO.

A vacuum gas oil is a crude oil fraction that boils between about 343° C. (650° F.) to 537° C. (1000° F.). A vacuum residuum is a residuum obtained by vacuum distillation of a crude oil and boils above a temperature about 537° C.

Another way of determining resid core structure is to crack resid structure by thermal or other selective dealkylation chemistry. Coking is a major problem in the thermal cracking approach because of the secondary reactions. Thermal cracking under hydrogen pressure may yield less coking but can still alter the building block structure by hydrodesulfurization. Quantitative assessment of building block distribution is very challenging.

Significant progress has been made in the determination of molecular formulas of heavy petroleum molecules. However, for the same molecular formula, different structures can be assigned. Heavy petroleum value and processability can be heavily affected by the assignment of core structures. There is not an easy method to generate the building block distribution. The present invention can dissociate petroleum molecules inside a mass spectrometer without forming coke. Building block information can be determined by the measurements of fragment ions.

SUMMARY OF THE INVENTION

The present invention is a method for the controlled fragmentation of a heavy hydrocarbon into the aromatic cores or building blocks. The method includes the steps of ionizing the hydrocarbon to form molecular ions or pseudo molecular ions, fragmenting the ions by breaking aliphatic C—C bond or C—X bond of the ions where X may be a heteroatom such as S, N and O. The invention also includes generating parent molecules from these building blocks.

Pseudo molecular ions include protonated ions, deprotonated ions, cation or anion adduct of parent molecule of the heavy petroleum or hydrocarbon sample.

The controlled fragmentation is performed by collision-induced dissociation (also called collision activated dissociation). The controlled fragmentation is also enhanced by multipole storage assisted dissociation.

BRIEF DESCRIPTION OF THE FIGURES

FIG. 37*a*-37*h* shows the set of cores or building blocks.

FIG. 38 shows the saturate cores.

DESCRIPTION OF THE PREFERRED EMBODIMENT

The present invention describes a method of generating composition and structures of building blocks in heavy petroleum resid. The technology first generates parent petroleum molecule ion or pseudo molecular ions using various soft ionization methods. These parent ions are subjected to various fragmentation reactions within a mass spectrometer. Fragment ions are characterized in ultra-high resolution mode. Chemical building blocks of heavy resid and their concentrations can thus be determined. In a preferred embodiment, the present invention uses collision-induced dissociation Fourier transform ion cyclotron resonance mass spectrometry (CID-FTICR-MS)

Petroleum parent molecule ions can be generated by various ionization methods including but not limited to atmospheric pressure photon ionization, atmospheric pressure chemical ionization, electrospray ionization, matrix assisted laser desorption ionization, field desorption ionization etc. All ionization methods can be operated under positive and negative conditions and generate different assemblies of molecule ions. These molecule ions are further fragmented inside a quadrupole ion trap or inside an ion cyclotron resonance cell individually or as a group. The fragment ions are analyzed under high resolution MS conditions. Core structures are assigned to these fragment products. They represent structures that cannot be further decomposed. These structures are the building blocks that can be used to reconstruct resid molecules.

Figure 1:
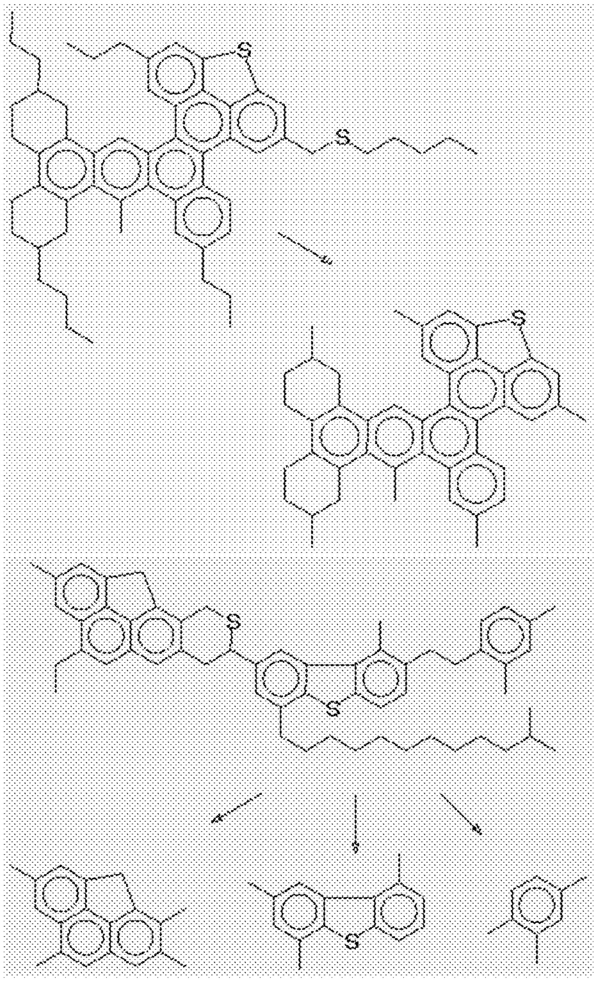
FIG. 1 shows Single versus Multi-core Structures.

Heavy petroleum is normally referred as 1000° F.+ petroleum fractions or the bottoms of vacuum distillation. It is generally believed that heavy petroleum are mostly made of cores or building blocks that can be found in lower boiling fractions, such as vacuum gas oils. The information of building block distribution has significant implications in resid quality evaluation, processability assessment and product quality determination after resid processing. For example, FIG. 1 illustrates that an empirical formula, $C_{58}H_{68}S_2$, with a molecular weight 810 g/mol. It can be assigned with two drastically different chemical structures. The top structure represents a single core molecule. When undergoing thermal chemistry, most of its mass will become coke. The bottom structure represents a multi-core molecule. It will produce a number of small molecules that have more values. Thus the values of the resid molecule (same empirical formula) is quite different with the two representations.

One way to obtain building block information is to perform detailed characterization of VGO of corresponding resid. There are a number of issues with this approach in addition to analytical cost and time required for detailed characterization. First of all, VGO molecules do not represent all cores existed in resid. Certain larger aromatic cores (>6 aromatic rings) and multi-heteroatom molecules cannot be found in VGO. Secondly, the building block distribution of resid may not be the same as that in VGO.

Another way of determining resid core structure is to crack resid structure by thermal or other selective dealkylation chemistry. Coking is a major problem in the thermal cracking approach because of the secondary reaction. Thermal cracking under hydrogen pressure may yield less coking but can still alter the building block structure by hydrodesulfurization. Quantitative assessment of building block distribution is very challenging.

The present invention uses controlled fragmentation of parent molecule ions inside a mass spectrometer to determine cores or building block distribution of a petroleum resid. More specifically, various soft ionization methods, such as atmospheric pressure photoionization (APPI), atmospheric pressure chemical ionization (APCI), electrospray ionization (ESI), matrix assisted laser desorption ionization (MALDI), field desorption ionization (FD) etc. were used to generate molecular ions or pseudo molecular ions. Ultra-high resolution mass spectrometry by FTICR-MS provides elemental formulas of all ions. Parent ions are then fragmented inside the mass spectrometer to generate building block information. Multiple dissociation technologies can be used to fragment molecular ions, including collision-induced dissociation (CID), surface-induced dissociation (SID), Infrared Multiphoton Dissociation (IRMPD), sustained off-resonance irradiation (SORI) etc. The location of the fragmentation can be in a quadrupole ion trap before the ICR cell or inside the ICR cell. Fragment ions were determined by ultra-high resolution mass spectrometer. Aromatic structures were assigned to these fragments. Building block distributions can thus be determined by the technique. For illustration purpose, APPI is used in this memo to ionize petroleum resid molecules. Molecular ions are fragmented in a quadrupole ion trap by CID using argon as neutral targets. Fragment ions were transferred into the ICR cell where they are analyzed in a ultra-high resolution mode.

Core Structure Analysis by Collision-Induced Dissociation

Figure 2:
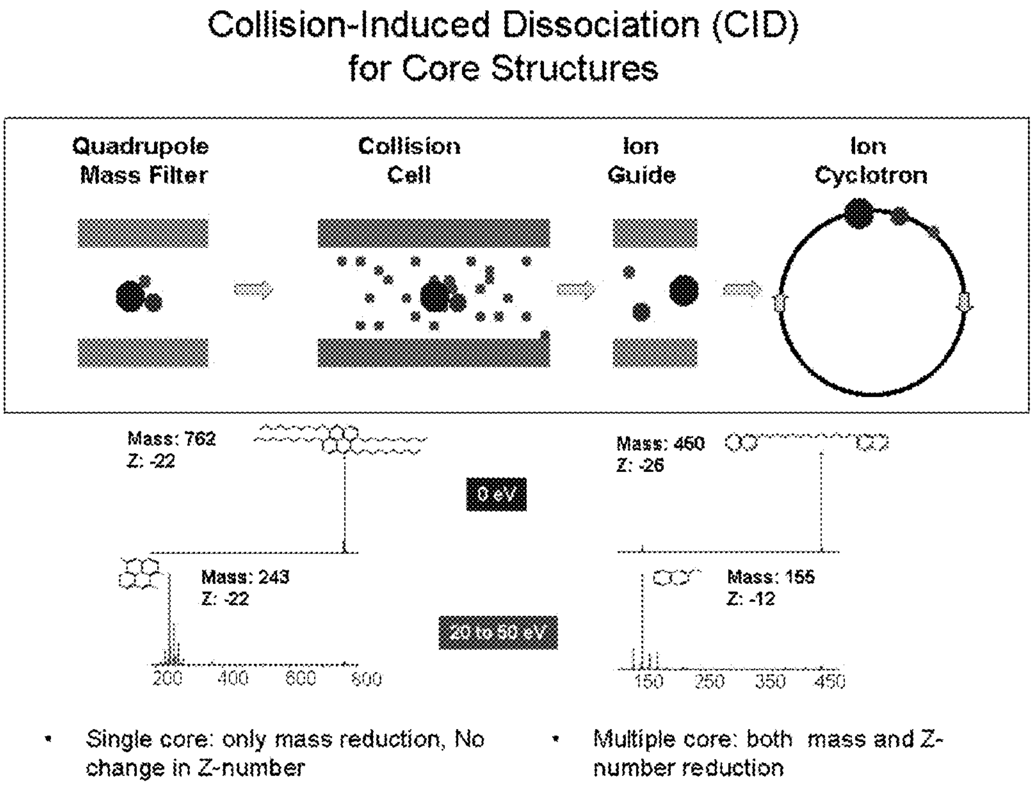
FIG. 2 shows use of CID to Differentiate Single core (tetradecyl pyrene) versus Multi-core (binaphthyl tetradecane) Structures.

A simplified view of CID-FTICR-MS experiments for resid core structure analyses is illustrated in FIG. 2. Ions generated by various soft ionization methods can be transferred all together or selectively to the collision cell. Fragment ions are guided to ICR cell for normal FTICR analysis. If molecules are single cores (such as tetradecyl pyrene), we would only expect molecular weight reduction. The degree of unsaturation (Z-number) of the molecules should be unchanged. If molecules are multi-cores (such as binaphthyl tetradecane), we would see both molecular weight and reduction in absolute Z-number. In this example, tetradecyl pyrene has a molecular mass of 762 and Z-number of −22. After CID, it yields a series of low mass fragments around 243. High resolution analysis showed that these are $C_1$ to $C_3$ pyrenes with the Z number of −22. Thus, we know that this molecule contains only a single core (pyrene). On the other hand, binaphthyl tetradecane has a molecular mass of 450 and Z-number of −26. After CID, it also yields a series of fragment ions around 155, high resolution analysis showed that these fragments are $C_1$ to $C_3$ naphthalenes with Z-number of −12. The results indicate that this molecule has a multicore structure. The building block is naphthalene.

There are two locations in the 12 tesla Bruker FTICR-MS that fragmentation of molecule ions can be performed. The first location is the RF only quadrupole ion trap (collision cell). Fragmentation is induced or activated by multiple collisions of ions with neutral molecules (Ar) at a pressure of $10^{-2}$ mbar (CID) or with a surface (SID). The second location is the FTICR cell. Fragmentation mechanism is Infrared multiphoton dissociation (IRMPD). Another fragmentation technique that can be performed in the ICR cell is called sustained off-resonance irradiation (SORI). This memo describes CID reactions occurring in the collision cell region.

The 12 tesla Bruker FTICR-MS is equipped with electrospray ionization (ESI), atmospheric pressure photoionization (APPI), atmospheric pressure chemical ionization (APCI), matrix assisted laser desorption ionization (MALDI), field desorption (FD) ionization, Direct Analysis in Real Time (DART), atmospheric pressure solid analysis probe (ASAP). All the ionization techniques can produce molecular ions or pseudo molecular ions. Pseudo molecular ions are defined as protonated or deprotonated molecular ions, cation or anion adducts of molecular ions. These ions are then subjected to fragmentation techniques as aforementioned.

Atmospheric pressure photoionization (APPI) is the primary ionization method in our CID study of petroleum resid fractions. A counter current flow of dry gas ($N_2$) of 3-8 L/min and a nebulizing gas of 1 to 3 L/min were employed to assist in the desolvation process. Nebulizing temperature was set at 450° C. Source pressure was maintained at 2 to 3 mBar to allow sufficient relaxation of ions. Molecule ions formed by APPI were collected by 2-stage ion funnels and accumulated first in an rf-only hexapole prior to injection into a quadrupole analyzer. The hexapole is operated at a voltage of 200 to 400 Vpp at a frequency of 5 MHz. Quadrupole mass analyzer were used to select masses of interests for the CID experiments. Ions passed quadrupole mass analyzer were accumulated in a collision cell comprised of a linear quadrupole operated in rf-only mode with $V_{pp}$ set at 690 V. Collision cell pressure was controlled at ~$10^{-2}$ mbar with argon as the collision gas. Spectra were acquired from the co-addition of 20 to 100 transients comprised of 4 M data points acquired in the broadband mode. Time domain signals were apodized with a half-sine windowing function prior to a magnitude-mode Fourier transform. All aspects of pulse sequence control, data acquisition, and post acquisition processing were performed using Bruker Daltonics Compass apexControl 3.0.0 software in PC.

Effect of Collision Energy on Fragmentation Pattern

Fragmentation pattern are governed by center of mass collision energy ($E_{CM}$ in kcal/mol) which is defined to the lab collision energy ($E_{lab}$ in eV) by equation 1.

$$E_{CM}=M_{Ar}/(M_{Ar}+M_{ion})\times E_{lab}\times 23.06 \quad \text{Equation 1}$$

Where $M_{Ar}$ is the mass of argon gas and $M_{ion}$ is the mass of a parent ion.

Figure 4:
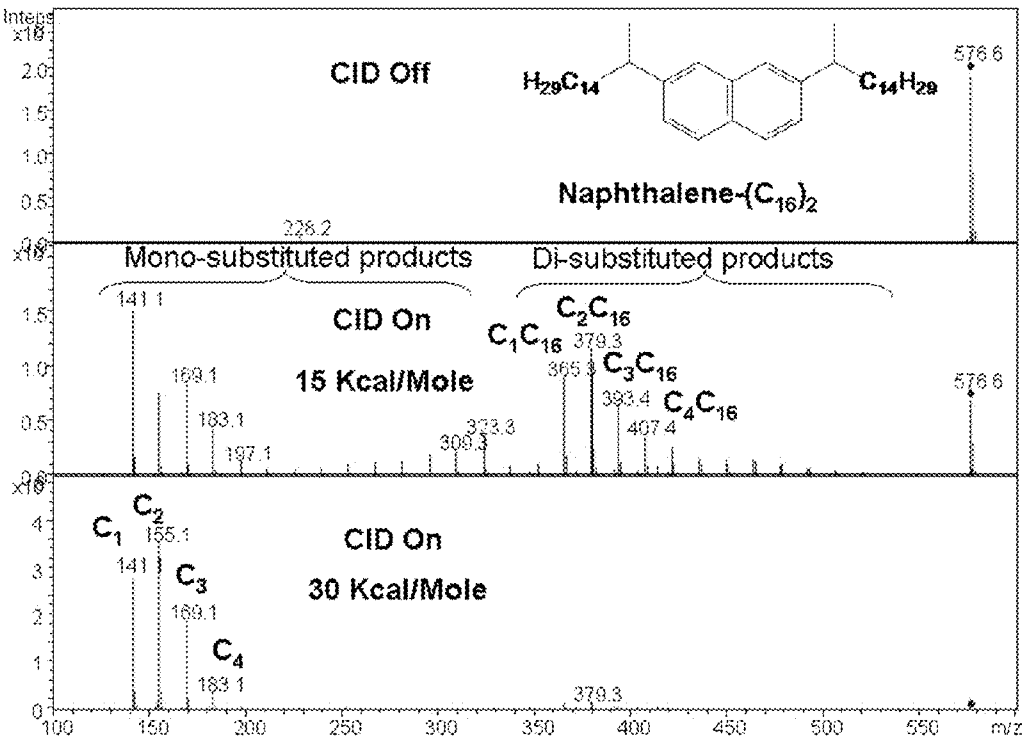
FIG. 4 shows CID of Di-C16-Alkyl Naphthalene.
Figure 5:
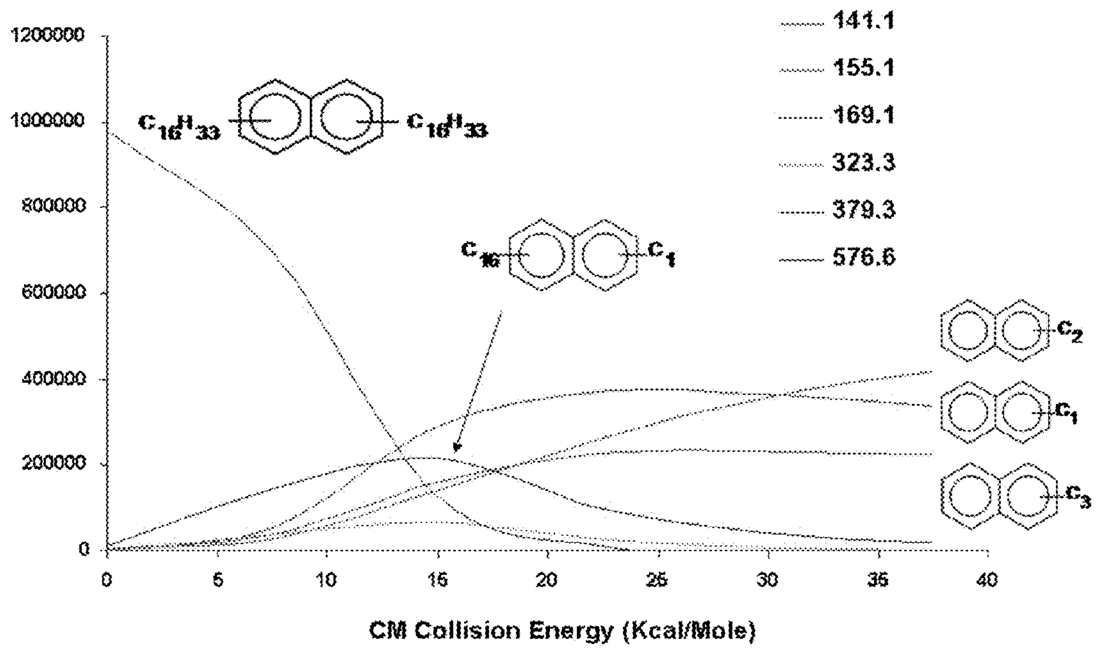
FIG. 5 shows Energy Breakdown Curve of Di-C16-Alkyl Naphthalene.
Figure 15:
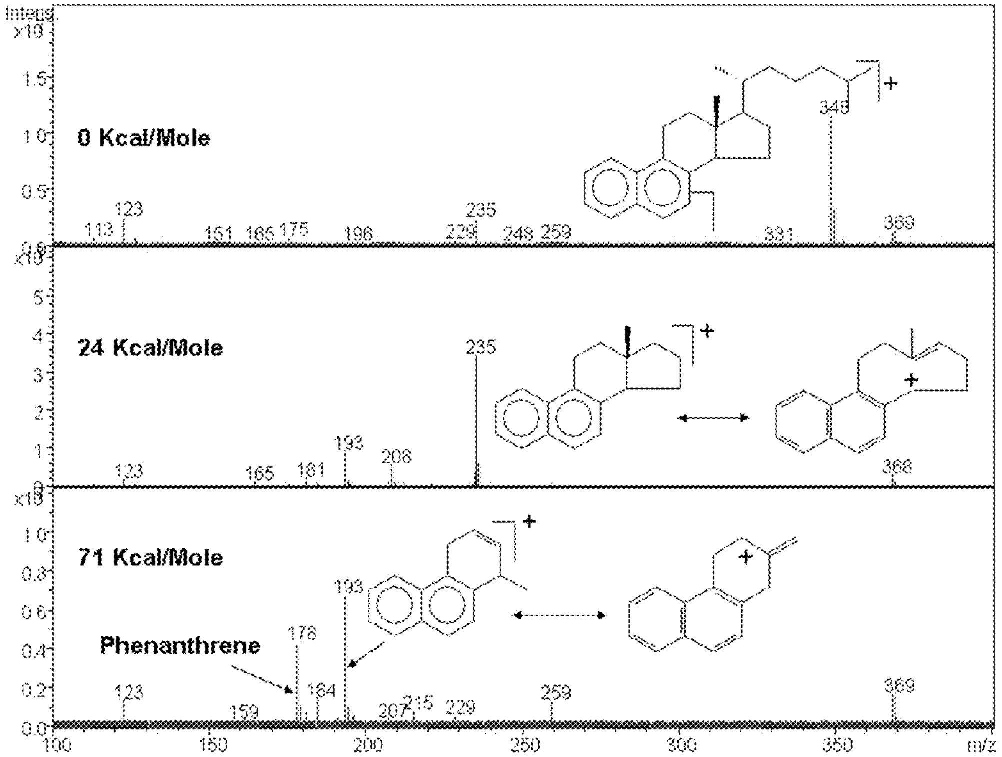
FIG. 15 shows C26 Diaromatic Sterane.

FIG. 4 showed CID mass spectra of dialkyl ($C_{16}$) naphthalene. At 15 kcal/mol, we saw both di and single substituted naphthalene fragments. At 30 kcal/mol, only singly substituted naphthalene fragments exist. $C_1$ to $C_3$ substitution are the predominant species. FIG. 5 shows the energy breakdown curves of di-alkyl naphthalene. To effectively break down dialkyl naphthalene into to $C_1$ to $C_3$ naphthalenes, greater than 20 kcal/mol of $E_{CM}$ is needed. FIG. 15 shows the energy breakdown curve of $C_{26}$ diaromatic sterane. Substantial ring opening can take place when $E_{CM}$ is greater than 40 kcal/mol. It is interesting to note that when ring opens, a double bond is formed. Z-number is conserved with or without ring opening.

Relative Response Factors of Core Building Blocks

Figure 3:
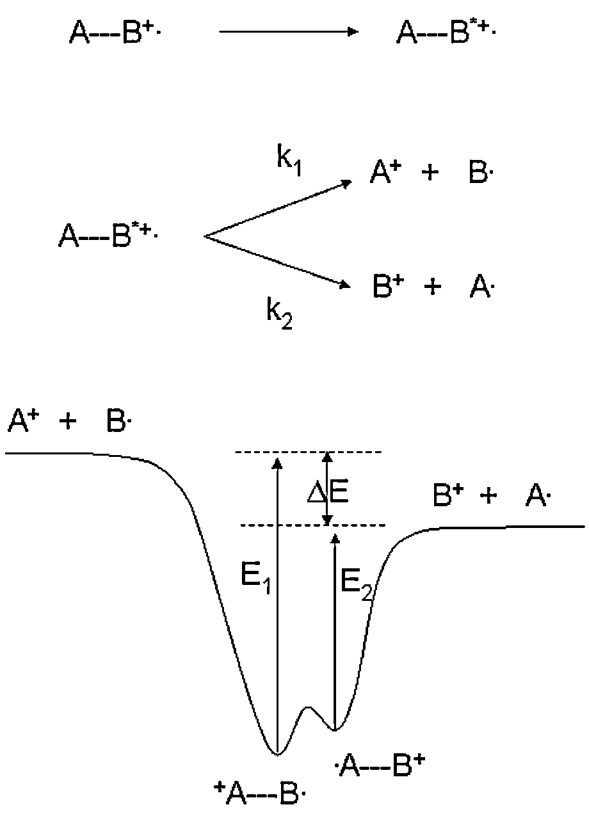
FIG. 3 shows Collisional Activation and Unimolecular Ion Dissociation.

Petroleum molecules are made of cores of different structures. FIG. 3 shows an energy diagram of molecule ion made of A and B cores. When this molecule ion dissociates, it will generate either A ion plus B neutral or B ion plus A neutral. Since a mass spectrometer can only detect ions, the probability of A or B carrying charges will affect the measurement of core populations. To evaluate the impact of core structures on CID product distribution, 3 model compounds were synthesized and evaluated by CID-FTICR-MS. These are Naphthlene-C14-Pyrene, Phenanthrene-C14-Dibenzothiophene and Phenanthrene-C14-Carbazole. To evaluate relative responses of these aromatic cores, we summed up all ions from corresponding cores and compared their relative abundances. The results are summarized in Table 1. Ionization potential is also listed in the table. Pyrene has a higher response than naphthalene because of lower ionization potential. Phenanthrene and DBT has very close response as expected by their close ionization potential and very similar molecular mass. Carbazole response is much higher than phenanthrene in part due to lower IP of carbazole. The more important factor may be that carbazole can form a more stable ion by re-arranging the proton on the nitrogen atom. Table 1 suggests that response factors are required when reconstruction of resid molecules based on CID data.

TABLE 1

IONIZATION POTENTIAL AND CID RELATIVES RESPONSE FACTOR

| Core | IP (eV) | RRF |
|---|---|---|
| Naphthalene | 8.14 | 0.85 |
| Pyrene | 7.43 | 1.15 |
| Phenanthrene | 7.89 | 1.00 |
| Dibenzothiophene | 7.90 | 0.99 |
| Carbazole | 7.57 | 5.33 |

Enhancement of Fragmentation by Multipole Storage Dissociation (MSAD) Effect

Fragmentation can occur or enhanced when ion accumulated to certain concentrations in the collision cell. This phenomenon has been defined as Multipole Storage Assisted Dissociation (MSAD). We have clearly observed the MSAD effect in the CID of petroleum samples where fragmentation pattern has been found related to the ion accumulation and sample concentration. More efficient fragmentation can be achieved when all ions in the collision cell are subjected to collision at the same time. One hypothesis is that once ion density reaches the charge limit in the multipole, the Columbic force will push ion ensembles to spread out radially, enabling the ion to oscillate at higher magnitude. This would allow the coupling of the rf energy in the hexapole rods to the ions, effectively accelerating them to higher kinetic energy. Extensive fragmentation is caused by collisions of excited ions with the gas molecules in the collision cell ($10^{-2}$ mbar). However, the fundamentals of the dissociation mechanism is the same as CID.

Quality Assurance of CID Data

Figure 17:
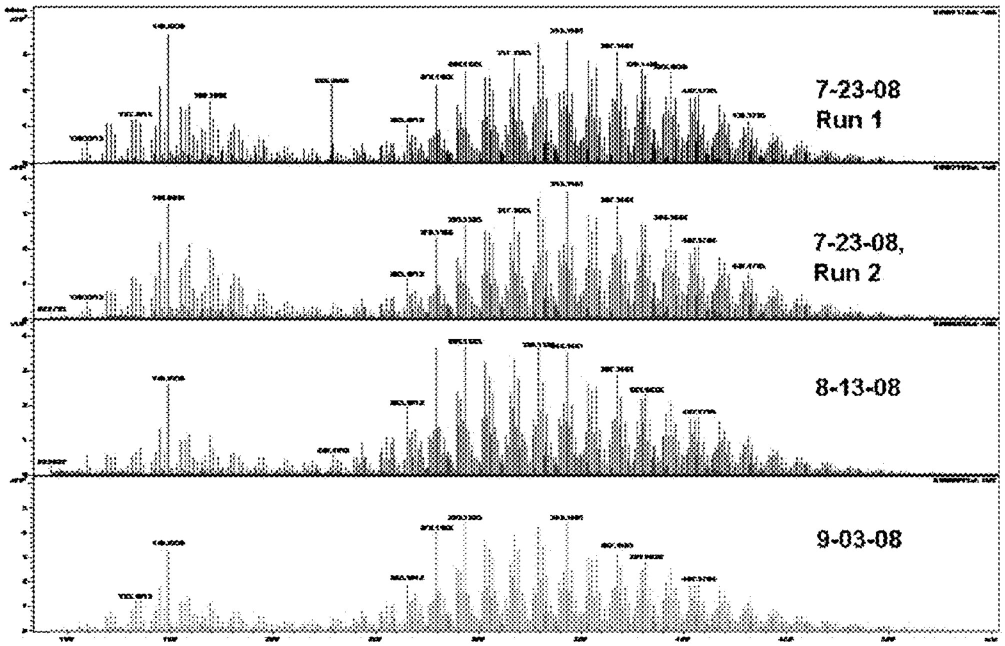
FIG. 17 shows Repeatability of DOBA ARC4+CID-FTICR-MS Spectra.

A practical implication of the MSAD effect is that concentrations and ion accumulation time need to be controlled to obtain reproducible results. For all petroleum samples, concentrations of the samples are prepared at ~2 mg/10 cc (~200 ppm W/V). Sample Infusion flow rate is maintained at 120 µL/hour. Since asphaltene samples have poor sensitivity, these samples are prepared at higher concentrations (~500 ppm) and higher infusion flow rate (~600 uL). Collision cell accumulation time is between 0.5 to 2 sec. Excitation energy (RF attenuation) is set to 14 to 20 to enhance low m/z detection. DOBA ARC4+ fraction is used to monitor the fragmentation consistency as shown in FIG. 17. The example covers a six week span. The resulting bimodal distribution is expected with the low mass distribution to be approximately half the intensity of the higher mass distribution. The separation mass for the two distributions is around m/z 229. Overall intensity is expected to be around $4\times10^7$.

Examples on CID of Vacuum Resid Molecules

Figure 18:
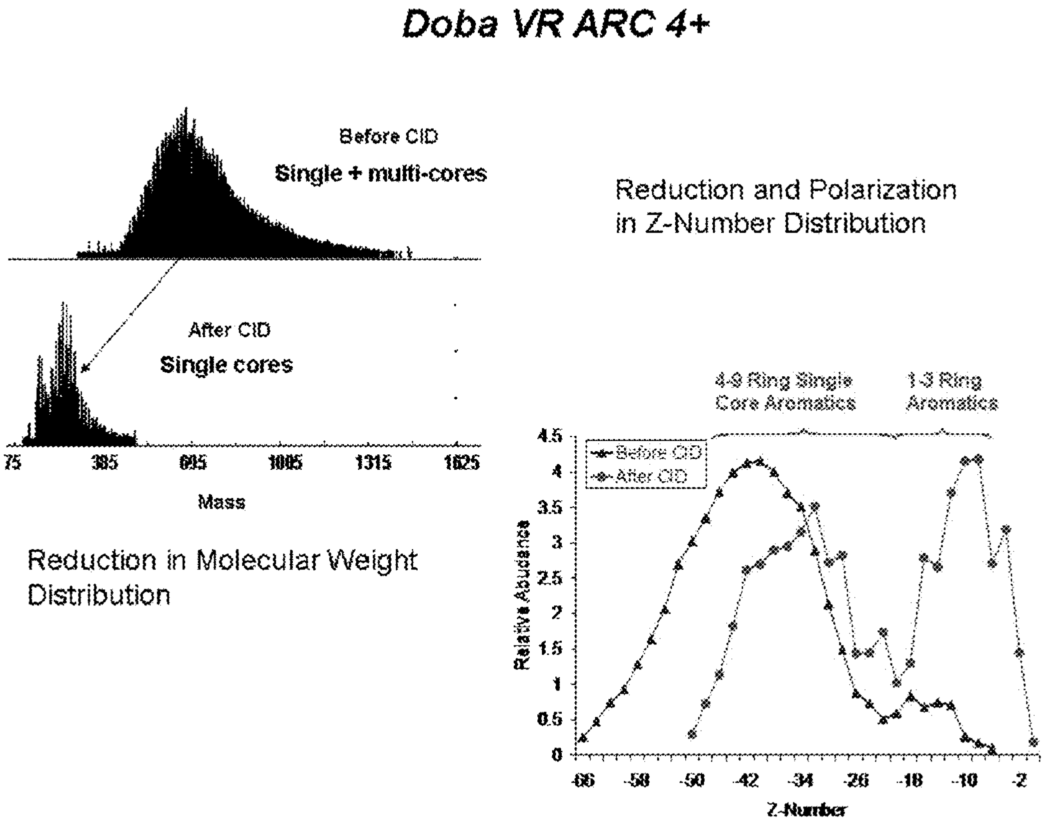
FIG. 18 shows CID of DOBA ARC4+ Fraction. Data showed reduction in Both Molecular Weight and Z-Number, Indicating the Presence of Multi-core Structures in Vac Resid.

FIG. 18 shows the changes in molecular weight distribution and z-number distribution before and after CID of a 4-ring aromatic fraction from DOBA vacuum resid. The reduction in molecular weight distribution is expected due to de-alkylations of VR molecules. The most interesting results are in z-number distribution where we observed a bimodal distribution. The distribution between Z=−6 and −20 are small aromatic molecules with 1 to 3 aromatic rings. The distribution after Z=−20 are more condensed aromatic structures (4 to 9 ring aromatics). This data confirmed multi-core structure concept of resid molecules and the presence of highly condensed and small aromatic building blocks in vacuum resid.

Figure 19:
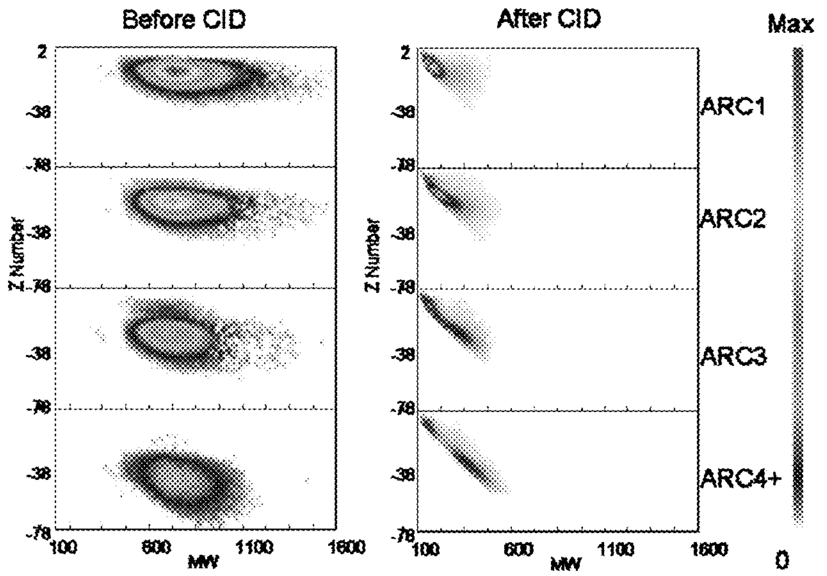
FIG. 19 shows the De-alkylation and multi-core structure breakdown illustrated by CID of DOBA ARC fractions wherein the X-axis is molecular weight, Y-axis is Z-number, and the abundances of molecules are indicated by the grey scale.

FIG. 19 displays two dimensional plots (Z and MW) of one to four ring aromatic fractions before and after CID. MW reduction was observed for all fractions. Molecules were effectively reduced to their core structures by CID. Z-reduction is mostly observed in 3 and 4 ring aromatic fractions, demonstrating prevalent multi-core structures in these fractions.

Construction of Resid Molecules Using CID Data

The present invention includes a way of generating building blocks in heavy petroleum resid. FIG. 37 identifies the building blocks as seen in resid CID experiments. The present invention also includes a method to create a set of molecules using these building blocks. These assignments are shown in FIG. 37. Each building block has 3 numbers associated with it. The first is an index to keep track of the building blocks. The second is the relative abundance and the third is the Z value for the particular building block. Naphthene cores were added to the collection as these cores are not ionized well in the FTICR-MS. Any intensities less than one were set to one.

Z is defined as hydrogen deficiency as in general chemical formula $C_cH_{2c+Z}N_nS_sO_o$. For example, all paraffin homologues fall into the same chemical formula $C_cH_{2c+2}$. Thus the Z-number of paraffins is +2. All benzothiophenes have the chemical formula $C_cH_{2c-10}S$. Its Z-number is −10. The more negative the Z-number, the more unsaturated the molecules.

With these building blocks determined, molecules can be generated using them. These molecules must satisfy the chemical class and Z requirements that result from the detection of the resid molecules by the FTICR-MS.

It is easier to create molecules if they are classified. Molecules are constructed that are saturates, aromatics, sulfides, polars, metal containing porphyrins and molecules containing large aromatics with 6 or more aromatic rings. For a saturate molecule, one uses only saturate cores. The aromatics classification is split into 4 classes: molecules with a maximum of one aromatic ring, molecules with a maximum of 2 aromatic rings and so forth. The aromatic ring class 4 includes those ring systems greater or equal to 4 aromatic rings. In building molecules, a core that meets the specification of the classification is chosen first. Additional cores are drawn from the pool of cores that would still make the classification using the abundance for that core. A molecule classified as a 3 ring aromatic would have as the first core a 3 ring aromatic. After that, the available cores would be the 1-3 ring aromatics, and the saturate cores. For a sulfide, the first of the cores must be a sulfide while any other cores comprising the molecule can be either sulfide, saturate or aromatic. Similarly, for a polar molecule, there must be one core that is either a basic nitrogen, acid or phenol (these are the "polar" cores). The other cores in a molecule can be chosen from the saturates and aromatics. For a metal containing porphyrin, the first core chosen must be the porphyrin. The rest of the cores can be chosen from the entire collection. Lastly, the classification of large aromatics requires a core which has at least 6 aromatic rings. Additional cores are selected from the entire collection. Note that the additional cores are chosen based on abundance which means that there will be significant number of cores that are saturates and small 1 and 2 ring aromatic cores in the constructed molecules.

Figure 39:
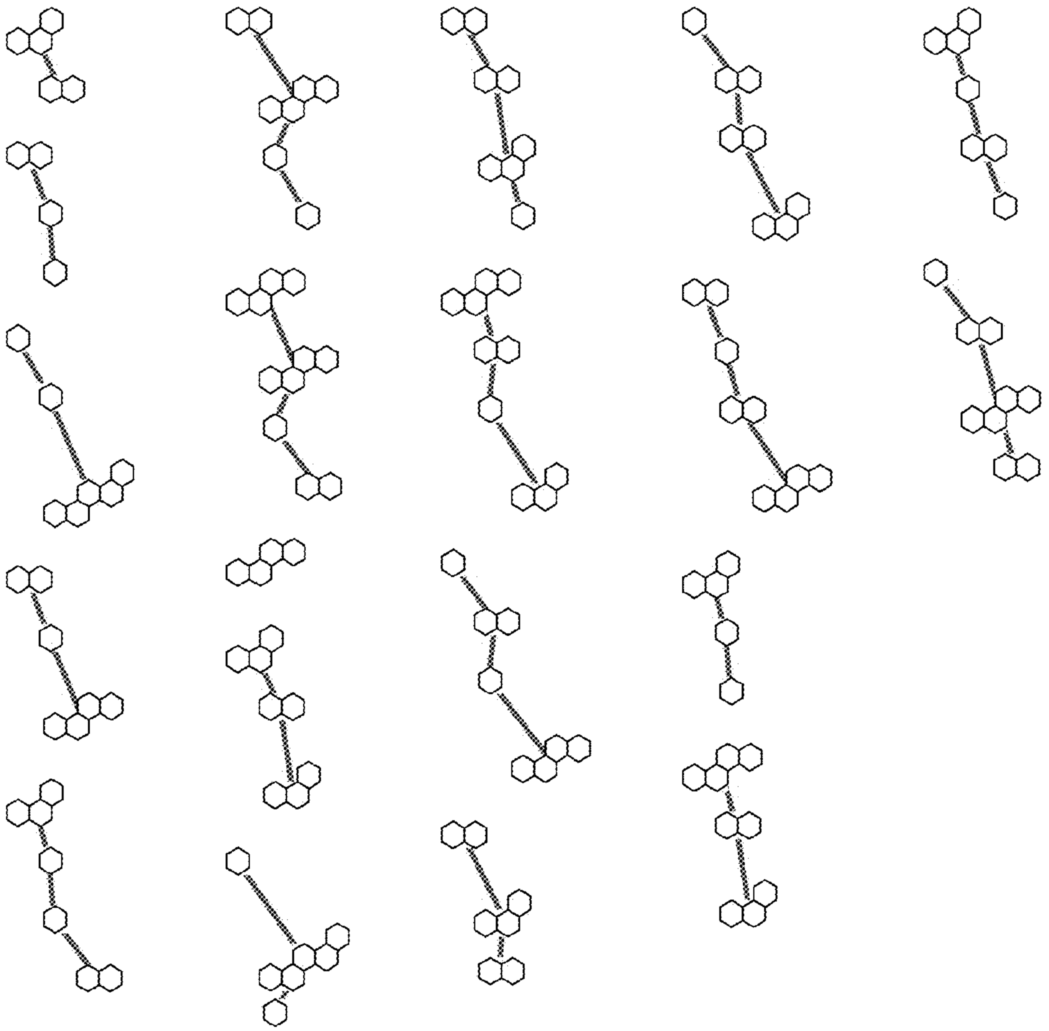
FIG. 39 shows a set of generated saturate parent molecules.
Figure 40:
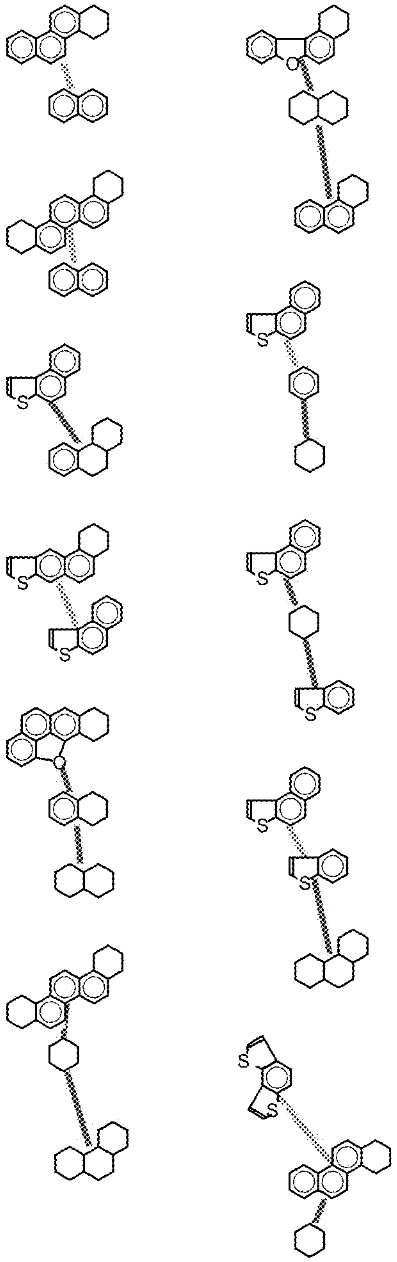
FIG. 40 shows generated parent molecules in aromatic ring class 3 classification.

To make a collection of saturate molecules, one would use only saturate cores. FIG. 38 shows the saturate cores with their respective abundances. The abundances are used to determine the likelihood of choosing a particular core. In this way, one steps through molecules with different numbers of cores or building blocks and create molecules using those building blocks that are fully saturated. Integer factors are based on the weight/abundance of the particular core as was determined or estimated in the assignments based on CID experiments. These integer factors are used in a stochastic way to randomly build molecules containing the saturate cores. The higher the value, the more likely that core will be chosen. One loops thru this many times to get a large selection of molecules. Only one duplicate core is allowed so one cannot have a 4 core molecule containing 3 cyclohexane building blocks. Constraints are set in this loop as to min and max Z, max number of a given heteroatom, as well as constraints on mixtures of heteroatoms in one molecule. The saturate molecules constructed by this procedure are shown in FIG. 39. Examples are shown for the aromatic ring class 3 in FIG. 40.

Because the loop thru each chemical class is performed many times for all the different classifications, a large array is created, an array of about 10,000 unique molecules ranging in size from single core (the initial building blocks) to molecules containing 5 cores or building blocks as the maximum number of cores or building blocks has been set to 5. Duplicate molecules are removed as well.

Overview of Fragmentation and Reconstruction Procedures

1. Samples are ionized by soft ionization methods to form molecular ions or pseudo molecular ions, such as protonated ions and other adducts ions.
   a. Ionization methods include but not limited to atmospheric pressure photoionization, atmospheric pressure chemical ionization, electrospray ionization, matrix assisted laser desorption ionization etc. in positive and negative ion modes
   b. Ions can be in cation or anion forms
2. Adjust instrument parameters to control fragmentation pattern of a quality assurance (QA) sample
   a. Collision energy varies from 0 to 50 V
   b. Ion accumulation time in collision cell varies from 0 to 10 sec
   c. Other instrument parameters are adjusted to meet QA requirements and maximize signal magnitude 3. A standard vacuum resid sample (in this case, DOBA ARC4+ fraction) is used as QA and to gauge the degree of fragmentation in positive ion APPI operations. Ratios of total small building blocks (sum of species with Z from +2 to −20) to large building blocks (sum of species with Z from −20 to −60) is controlled at 45+/−5%
   a. Under this condition, all aliphatic C—C bond, C—X (X=N, S, O) and X—X bond are broken
   b. Aliphatic-aromatic C—C bond, aromatic-aromatic C—C bond and aromatic C—X are not broken
   c. Alkyl substitution are mostly C1-C3
4. External and internal mass calibrations are conducted.
5. Data are analyzed to generate empirical formulas of fragment products
6. Single-core structures are assigned to the fragment products
7. Resid structures are re-constructed by stochastic assemble of fragment products as described in the last section of the memo.

Appendix I includes more details on the identification and quantification of aromatic building blocks.

APPENDIX I

Identification and Quantification of Aromatic Building Blocks Using Collision-Induced Dissociation Fourier Transform Ion Cyclotron Resonance Mass Spectrometry

Introduction

Petroleum composition and structure below 1000° F. have been largely determined under the frame work of High Detailed Hydrocarbon Analysis (HDHA)[1]. Molecules in naphtha range are measured by high resolution GC PIONA ($C_4$ to $C_{12}$ paraffins, isoparaffins, olefins, naphtha and aromatics). Distillates are characterized by GC-Field Ionization High Resolution Time-of-Flight Mass spectrometry combined with GC-FID (normal paraffin) and SFC (Lumps of Paraffins, Naphthenes, 1-3 Ring Aromatics)[2,3]. Vacuum Gas Oil requires multi-dimensional LC separations (Silica Gel and Ring Class)[4,5] followed by low or high resolution mass spectrometry and NMR. Various bulk property measurements were conducted on separated fractions. A model of composition is developed by reconciling all analytical information[1-3].

Relative to 1000° F.− petroleum fractions, 1000° F.+ petroleum fractions are much more challenging to characterize because of the low volatility, low solubility, high heteroatom content, low H/C ratio and higher molecular weight of the samples. A research protocol for determination of petroleum composition and structure above 1000° F. has been recently developed by our group. A separation scheme similar to that of gas oil HDHA is developed for vacuum resid (VR) with an addition of de-asphaltene step. The separated fractions are subjected to analysis by ultra-high resolution Fourier transform ion cyclotron resonance mass spectrometry (FTICR-MS), NMR, XPS and other bulk analytical techniques. The process generates fifty to one hundred thousand molecules per crude.

The ultra-high resolution capability provides unambiguous identification of empirical formula for each mass peak detected by FTICR-MS. However, structure assignments are non-unique based on empirical formula. To make it even more complicated, there are multi-core structures in VR that are absent in 1000 F-petroleum. FIG. 1 illustrates that an empirical formula, $C_{58}H_{68}S_2$, with a molecular weight 810 g/mol can be assigned with two drastically different chemical structures. The top structure represents a single core molecule. When undergoing thermal chemistry, most of its mass will become coke. The bottom structure represents a multi-core molecule. It will produce a number of small molecules that have more values. Thus the values of the resid molecule (same empirical formula) are quite different with the two representations. A number of important questions need be answered about VR in order to achieve a composition for refining modeling purpose, such as populations of multi-core versus single-core structures, naphthenic, aliphatic, heteroatom linkages, aromatic and naphthenic building block distributions, heteroatom incorporation, length and branchiness of alkyl chains and quantitative MW distributions. In this report, we discuss the development of collision-induced dissociation (CID) technology for the determination of aromatic building blocks and their distributions. This information is used for reconstructing vacuum resid molecules.

Experimentals

Collision-Induced Dissociation Experiments

All experiments were conducted on a 12 tesla Bruker Apex FTICR-MS equipped with electrospray ionization (ESI) and atmospheric pressure photoionization (APPI). APPI is the primary ionization method in our CID study of aromatic ring class fractions, sulfides and asphaltenes. A counter current flow of dry gas ($N_2$) of 3-8 L/min and a nebulizing gas of 1 to 3 L/min were employed to assist the desolvation process. Nebulizing temperature was set at 450° C. Source pressure was maintained at 2 to 3 mBar to allow sufficient relaxation of ions. Molecule ions formed by APPI were collected by 2-stage ion funnels and accumulated first in an rf-only hexapole prior to injection into a quadrupole analyzer. The hexapole is operated at a voltage of 200 to 400 Vpp at a frequency of 5 MHz. Quadrupole mass analyzer were used to select masses of interests for the CID experiments. Ions passed quadrupole mass analyzer were accumulated in a collision cell comprised of a linear quadrupole operated in rf-only mode with Vpp set at 690 V. Collision cell pressure was controlled at ~$10^{-2}$ mbar with argon as the collision gas. Spectra were acquired from the co-addition of 20 to 100 transients comprised of 4 M data points acquired in the broadband mode. Time domain signals were apodized with a half-sine windowing function prior to a magnitude-mode Fourier transform. All aspects of pulse sequence control, data acquisition, and post acquisition processing were performed using Bruker Daltonics Compass apexControl 3.0.0 software in PC.

There are two locations in Bruker FTICR-MS that fragmentation of molecule ions can be performed. The first location is the RF only quadrupole ion trap (collision cell). Fragmentation is induced or activated by multiple collisions of ions with neutral molecules (Ar) at a pressure of $10^{-2}$ mbar. Resolution of quadrupole mass filter before the collision cell is very limited. The second location is the FTICR cell. Fragmentation mechanism is Infrared multiphoton dissociation (IRMPD). Our focus of this report is on the CID reactions conducted in the collision cell region.

A simplified view of CID-FTICR-MS experiments for resid core structure analyses are illustrated in FIG. 2. Ions generated by various soft ionization methods can be transferred all together or selectively to the collision cell. Fragment ions are guided to ICR cell for normal FTICR analysis. If molecules are single cores (such as di-alkyl naphthalene), we would only expect molecular weight reduction. The degree of unsaturation (Z-number) of the molecules should be unchanged. If molecules are multi-cores (such as binaphthalenyl tetradecane), we would see both molecular weight and Z reduction. In all model compound experiments, ions are filtered by a quadrupole analyzer with an isolation window set between 1 and 5 Dalton. Laboratory collision cell voltages vary between 0 to 50 V. To construct energy breakdown curve, lab energy ($E_{lab}$) is converted into Center of Mass ($E_{CM}$) energy and energy unit is converted from eV into Kcal/mol using equation 1

$$E_{CM}=M_{Ar}/(M_{Ar}+M_{ion})*E_{lab}*23.06 \quad \text{Equation 1}$$

Where $M_{Ar}$ is the mass of argon gas and $M_{ion}$ is the mass of a parent ion. Energy breakdown curves are plotted by normalizing sums of major products signal to 1 million.

For petroleum samples, we choose to send all ions into the FTICR cell and subject them to collisions with argon gas. The fragments are consequently analyzed by FTICR-MS in ultra-high resolution mode. Collision energy has been fixed at 30V for vacuum resid and 20V for gas oils (see discussions).

Samples

Model compounds are synthesized internally or purchased from a commercial source. Table 2 summarized the model compounds that have been subjected to CID experiments and purpose of the experiments. Some are mixtures of compounds with different alkyl substitutions. In most model compound experiments, we use quadrupole mass filter to isolate molecule ion before CID.

VR samples were generated from crude distillation assay. A total of four VRs were characterized by CID. In addition, we also analyzed three gas oil HDHA fractions to help us understand CID chemistry on petroleum molecules. The samples are summarized in Table 3.

Results and Discussions

A Brief Overview of CID Fundamentals

Collision-Induced Dissociation (CID) has been widely applied in mass spectrometric characterization of organic molecules and mixtures. The fundamentals of CID mechanism, kinetics and dynamics have been extensively studied. CID is normally considered a two step process. The first step involves Collisional activation of parent ion to an excited state, which subsequently going through a unimolecular ion dissociation process. The fragmentation pathways are governed by internal energy deposition and ion structures as given in RRKM theory or quasi-equilibrium theory (QET) and is independent of ionization process that are used to create parent ions. For a two core system, the process can be depicted in FIG. 3. A simple approximate relationship between ionization potential (IP) and critical energy (E) can be derived from equation 2

$$\begin{aligned}\Delta E &= E_1 - E_2 \quad \text{Equation 2}\\ &= \Delta H_f(A^+) + \Delta H_f(B^\cdot) - \Delta H_f(B^+) - \Delta H_f(A^\cdot)\\ &= (\Delta H_f(A^+) - \Delta H_f(A^\cdot)) - (\Delta H_f(B^+) - \Delta H_f(B^\cdot))\\ &\approx IP_A - IP_B\\ &= \Delta IP\end{aligned}$$

Hence, writing an Arrhenius unimolecular rate expression, k=A×exp(−E/kT), and assuming the pre-exponential frequency factors for reaction 1 and 2, one obtains $$\mathrm{Ln}(k_1/k_2)=(E_2-E_1)/kT\approx\Delta IP/kT \quad \text{Equation 3}$$

Thus, the abundances of cores that carry charges are roughly determined by their relative ionization potentials. This is generally referred as Steven's rule in mass spectrometry. If core components of a resid molecule are very different in their ionization potential, it is expected that CID products will favor the core that has the lowest ionization potential. Response factor calibration thus becomes necessary. More detailed fragmentation mechanisms can be found in McLafferty's book on interpretation of mass spectra[6]

Collision energy of a single collision event is controlled by the lab collision energy, the mass of analyte ion and mass of neutral molecule. The energy deposition is normally less than that provided by the center of mass collision energy. Single collision only occurs in higher vacuum environment and found very limited applications in practical analyses because of low fragmentation efficiency. In the case of linear quadrupole ion trap, ion residence time are long (0.1 to 10 ms) and pressure is high (~$10^{-2}$ mBar), multiple collisions are occurring which lead to much higher energy deposition than that defined by lab collision energy. Internal energy distribution has been found very much like Boltzmann distributions, implying that the process is thermal in nature. The differences are that there is no bimolecular reaction between analyte ions in CID due to charge expulsion in CID process. Thus polynuclear aromatic growth (coking) in thermal process is largely minimized. More details on CID energy deposition have been summarized by Laskin and Futrell[7].

Enhanced Fragmentation by Multipole Storage Assisted Dissociation (MSAD)

CID fragmentation can be enhanced when ion accumulated to certain concentrations in the collision cell. This phenomenon has been named as Multipole Storage Assisted Dissociation (MSAD)[8]. We have clearly observed MSAD effect in the CID of petroleum samples where fragmentation pattern has been found related the ion accumulation and sample concentration. In most of our experiments, Q1 is open to let all ions into the collision cell. Molecule ions are more easily fragmented than if ions are isolated. We attribute this to the MSAD effect. Current theory of MSAD is that once ion density reaches the charge limit in the multipole, the Columbic force will push ion ensembles to spread out radially, enabling the ion to oscillate at higher magnitude. This would allow the coupling of the rf energy in the hexapole rods to the ions, effectively accelerating them to higher kinetic energy. Extensive fragmentation is caused by collisions of excited ions with the gas molecules in the collision cell ($10^{-2}$ mbar). However, the fundamental of the dissociation process is the same as CID.

CID of Model Compounds

Model compound experiments were conducted to answer a number of important questions about CID chemistry. We would like to know the weak versus strong bonds in CID process, the impact of CID on naphthenic ring structures, products distribution, especially the core distribution. The understanding will help us to rationalize results of petroleum samples.

De-Alkylation of Single Core Molecules

FIG. 4 shows the CID mass spectra of di-C16 alkyl naphthalene. There may be a methyl branching at the α carbon position because of double bond migration of 1-hexadecene in the synthesis process. The compound is not isomerically pure and alkyl can be in various aromatic ring positions. Thus interpretation of CID fragmentation pathways may not be considered rigid. When CID is off, there is no fragmentation as expected. When CID is on, the degree of fragmentation increases with the increase of collision energy. At 15 kcal/mol, we observed fragmentation products of mono- and di-substituted alkyl naphthalene. At 30 kcal/mol, almost all fragments are mono-substituted alkyl (C1 to C4) naphthalene with C2 product being most abundant. The energy breakdown curve of the compound is shown in FIG. 5. The abundances of di-substituted products goes up first and then decreases as collision energy increases, reflecting further dissociation of fragmented ions. Most fragments are odd mass species suggesting that they are even-electron (EE) ions formed via a cleavage as shown in reaction scheme 1.

reaction scheme 1

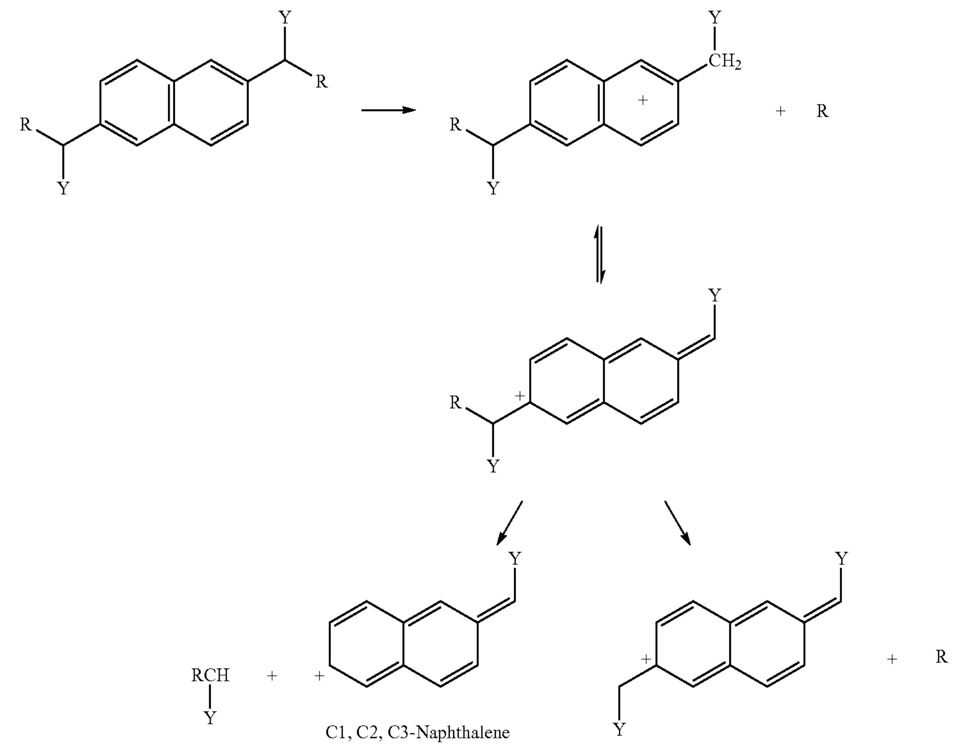

C1, C2, C3-Naphthalene

C2, C3, C4-Naphthalene

Y = H, CH3

Figure 6:
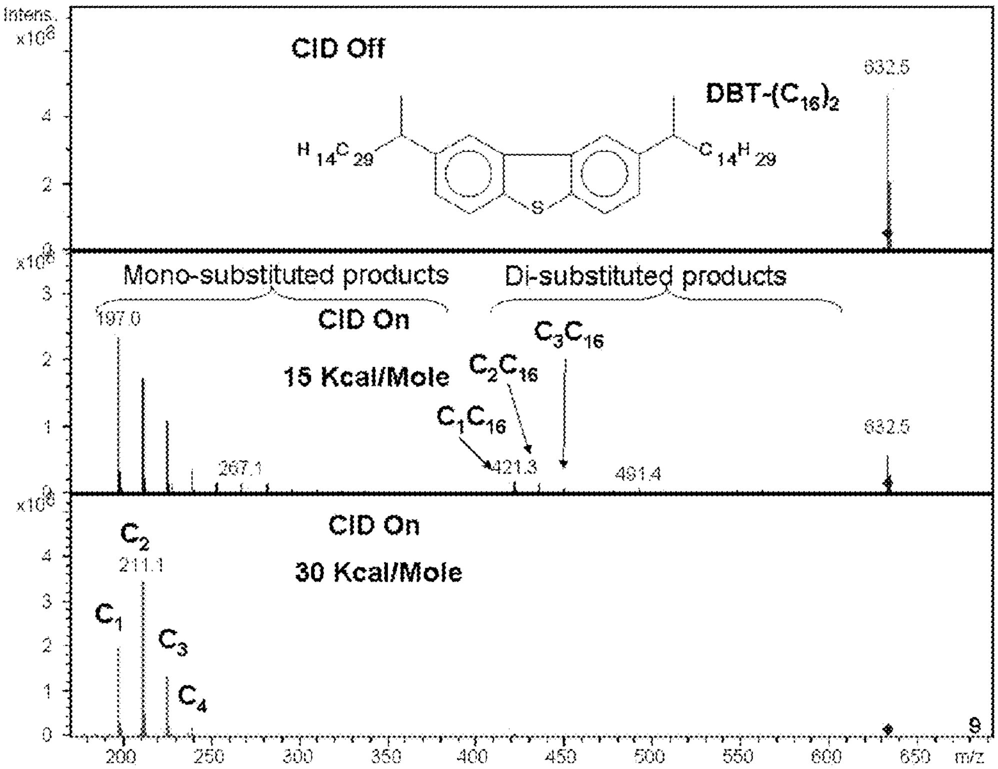
FIG. 6 shows CID of Di-C16-Alkyl Dibenzothiophene.
Figure 7:
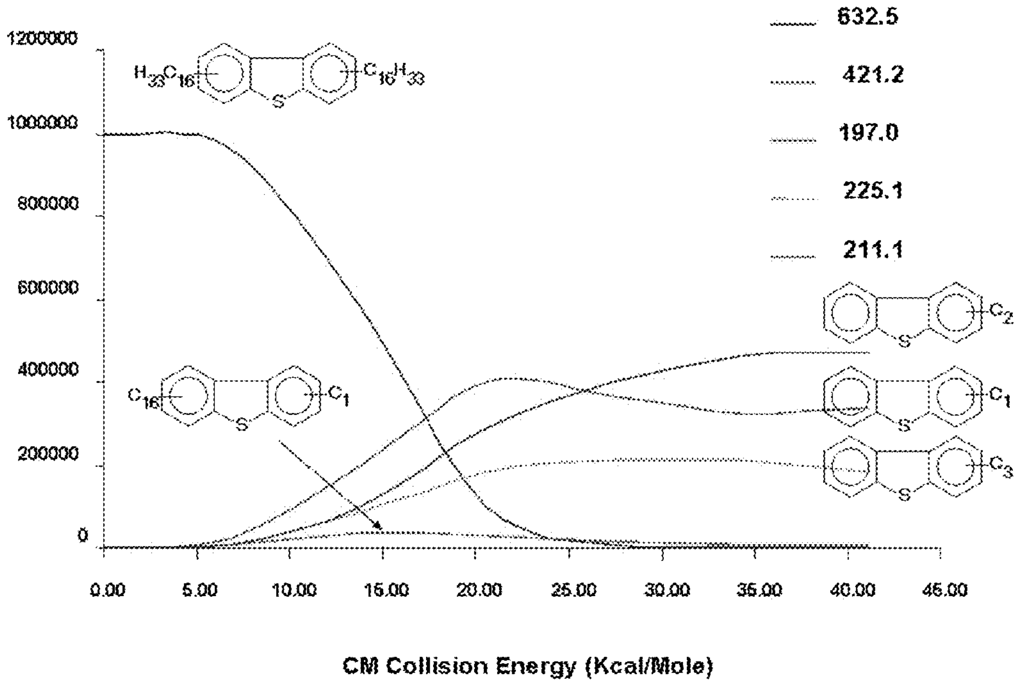
FIG. 7 shows Energy Breakdown Curve of Di-C16-Alkyl Dibenzothiophene.

FIG. 6 and FIG. 7 show the mass spectra and energy breakdown curve of di-C16 alkyl dibenzothiophenes. In different from alkyl naphthalenes, alkyl DBTs exhibit little di-substituted products and primarily mono-substituted products even at low collision energies. C1 to C4 DBTs are the major reaction products. The fragmentation mechanisms are similar to alkyl naphthalenes.

Overall we conclude that single core aromatics preserve aromatic structures in CID. In other words Z-numbers are preserved. Primary reactions are de-alkylations to shorter chain products. Because rearrangement reaction can happen in ion dissociation process, we observed multiple substituted aromatics were dealkylated down to C1 substituted structures which are rare in thermal chemistry.

Breakdown of Multi-Core Structures

Figure 8:
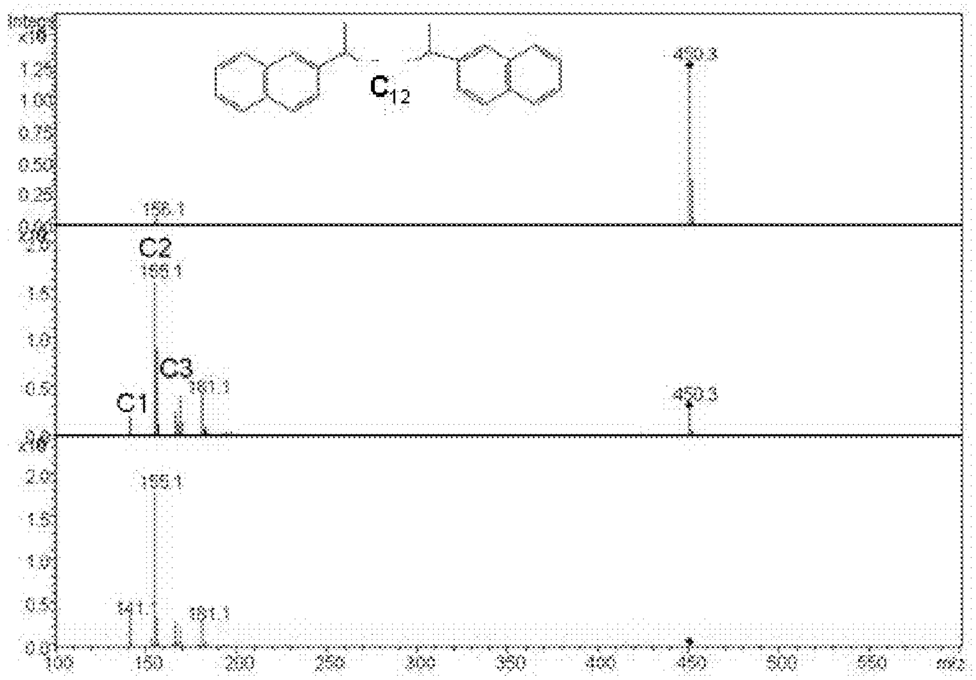
FIG. 8 shows CID of Binaphthyl tetradecane.

FIG. 8 shows the CID mass spectrum of a 2-core aromatic compound (Binaphthyl tetradecane). Major product is C2-naphthalene, arising from a cleavage as shown in reaction scheme 2.

reaction scheme 2

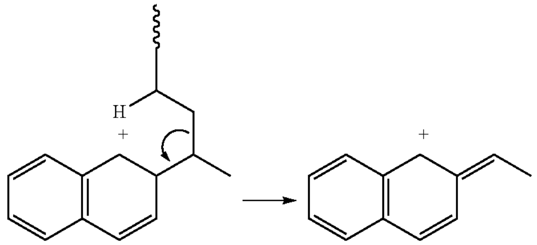

m/z 156

The even mass product ion (m/z 156) is produced by hydrogen rearrangement followed by α cleavage (reaction scheme 3). This reaction occurs even at CID off condition (note minor m/z 156 peak at zero collision energy). Another product, m/z 181, appears to be from cyclization of alkyl side-chains. Both reaction schemes 3 and 4 causes change in Z-number of constituting cores. In general, alkyl linked multicore structures will cleave under CID conditions result in Z-reduction of original structures. Primary product retains the Z-number of constituting cores.

reaction scheme 3

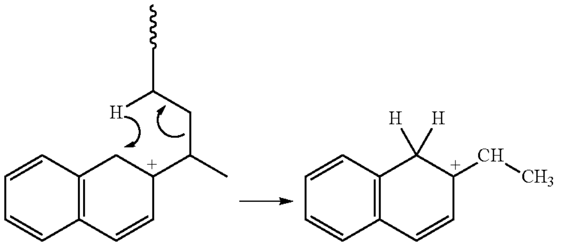

m/z 156 reaction scheme 4

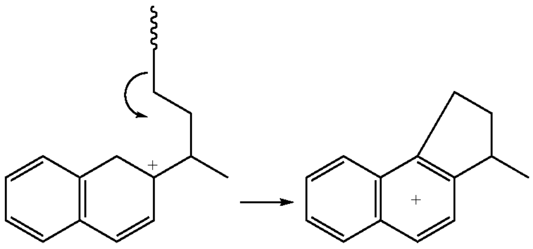

Effects of Core Size and Heteroatoms

Resid multi-cores may contain aromatic cores of different core sizes and sulfur and nitrogen-containing aromatics. To evaluate the impact of these factors on CID product distribution, 3 model compounds were synthesized and evaluated by CID-FTICR-MS. These are Naphthalene-$C_{14}$-Pyrene, Phenanthrene-$C_{14}$-Dibenzothiophene and Phenanthrene-$C_{14}$-Carbazole.

Figure 9:
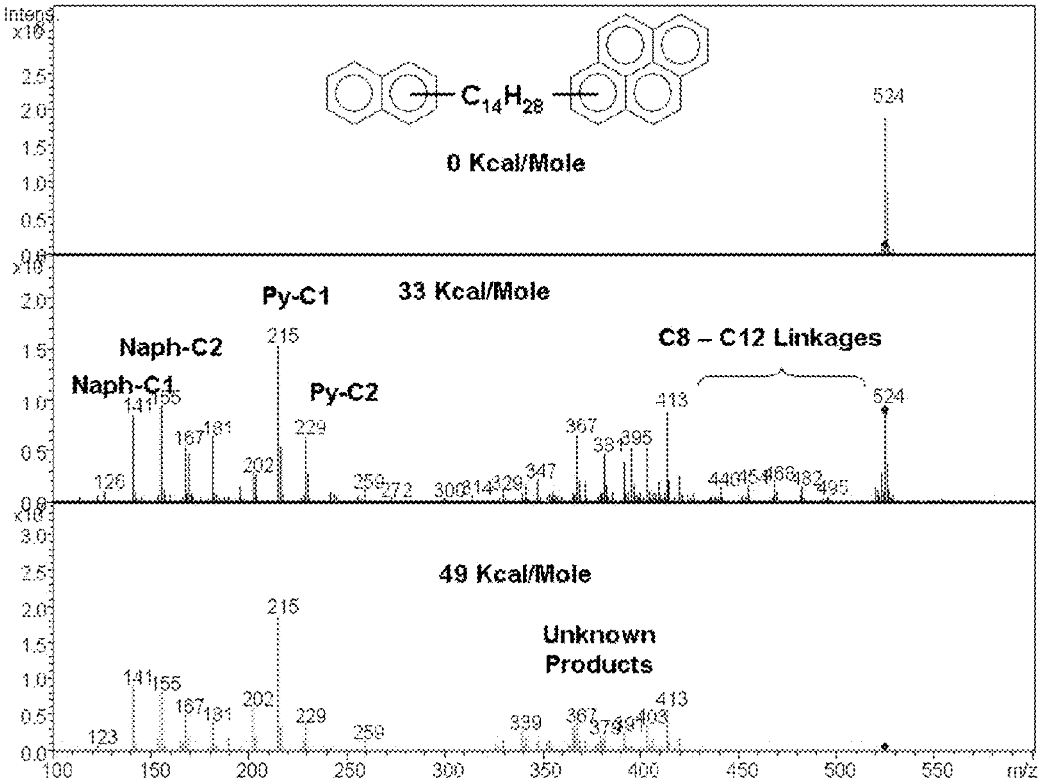
FIG. 9 shows CID of Naphthalene-C14-Pyrene.
Figure 10:
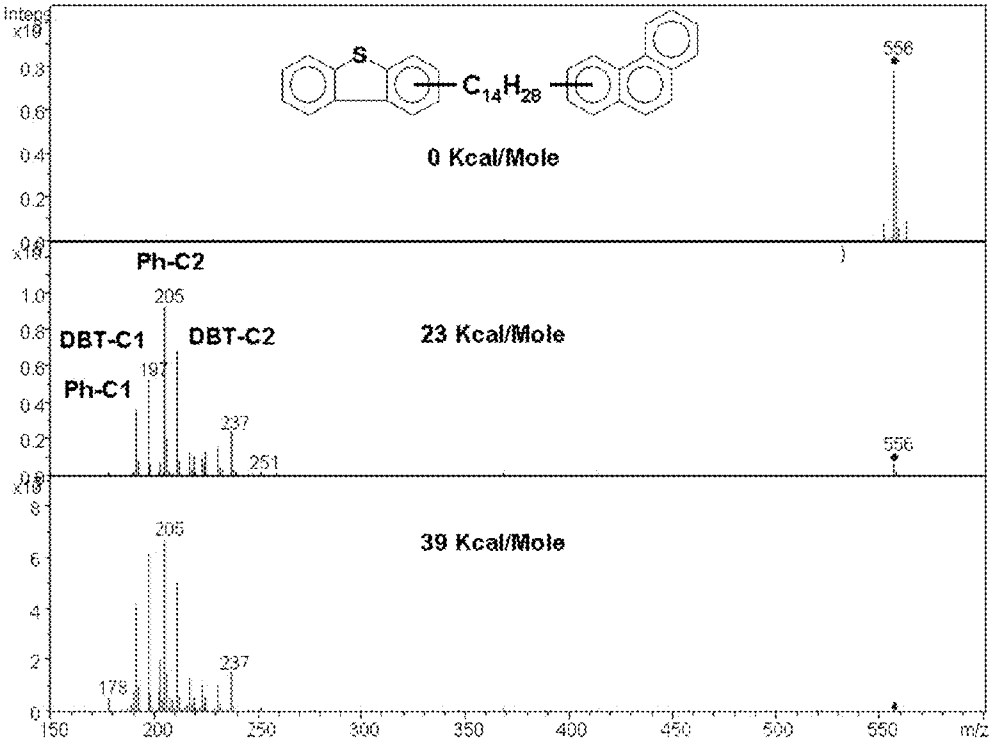
FIG. 10 shows CID of DBT-C14-Phenathrene.
Figure 11:
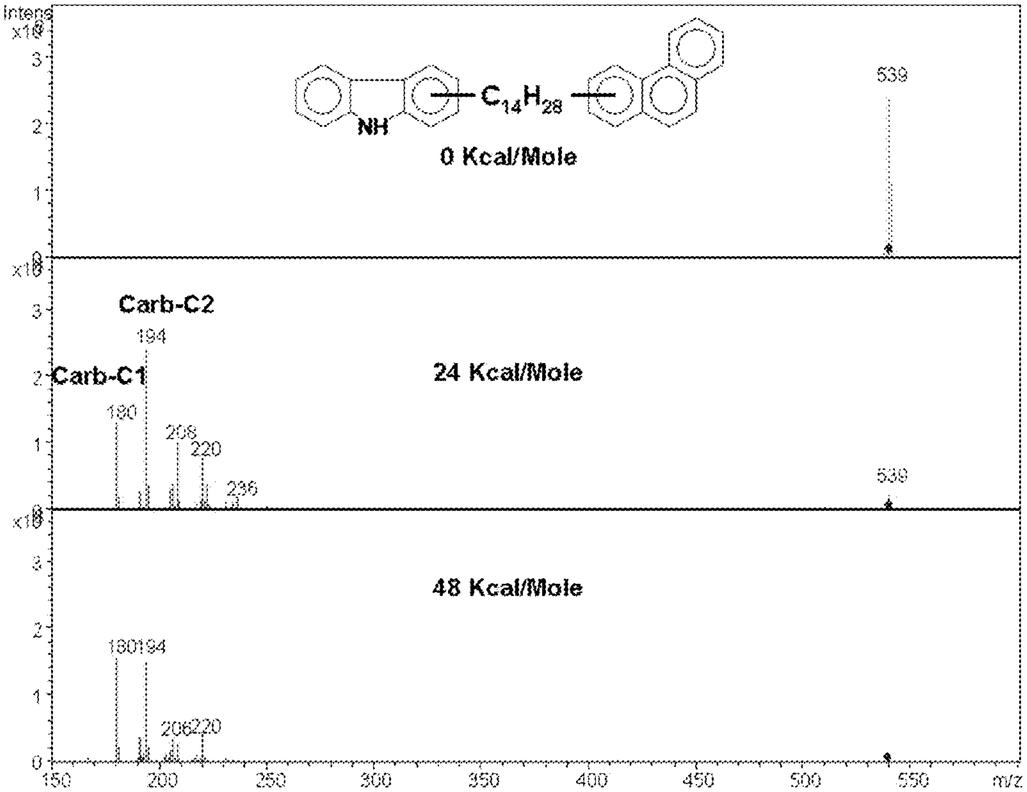
FIG. 11 shows CID of Carbazole-C14-Phenanthrene.

FIG. 9 shows the CID mass spectra of Naphthalene-$C_{14}$-Pyrene. The major products at high collision energies are $C_1$ and $C_2$ core aromatics. m/z 141, 155, 169 are $C_1$ to $C_3$ naphthalenes. m/z 215 and 229 are $C_1$ and $C_2$ pyrenes. We observed some even mass ions at 33/kcal/mol, these are likely from rearrangements of alkyl chains with reduced chains lengths. There are some product ions that we can not rationalize at this point. m/z 167 and 181 are likely cyclized products formed via similar mechanism as illustrated in Scheme 4. M/z 202 is the denuded pyrene core. It is abundant at high collision energies and is likely formed via intramolecular hydrogen transfer. FIG. 10 shows the CID mass spectra of Phenanthrene-$C_{14}$-DBT molecules under CID off condition and CID energies of 23 and 39 kcal/mol conditions. As expected, we observed primarily $C_1$ and $C_2$ DBTs and phenathrenes. Low levels of cyclic phenanthrene and DBT products (m/z 231 and 237) were also observed. FIG. 11 shows the CID mass spectra of Phenanthrene-$C_{14}$-Carbazole. The most abundant ions are m/z 180, 194 and 208, corresponding to $C_1$, $C_2$ and $C_3$ carbazoles. $C_1$ and $C_2$ phenathrenes (m/z 191 and 205) are present at lower levels. m/z 206 and 220 are cyclic carbazoles.

To evaluate relative responses of these aromatic cores, we summed up all ions from corresponding cores and compared their relative abundances in the high energy area where fragmentation pattern has been stabilized. The results are summarized in Table 1. Ionization potential is also listed in the table. Pyrene has a higher response than naphthalene because of lower ionization potential. Phenanthrene and DBT has very close response as expected by their close ionization potential and very similar molecular mass. Carbazole response is much higher than phenanthrene in part due to lower IP of carbazole. The more important factor may be that carbazole can form a more stable ions by re-arranging the proton on the nitrogen atom as shown in reaction scheme 5.

reaction scheme 5

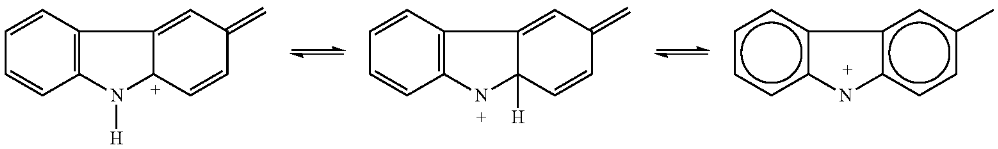

Strength of C1, C2 and Aromatic S Linkages

Figure 12:
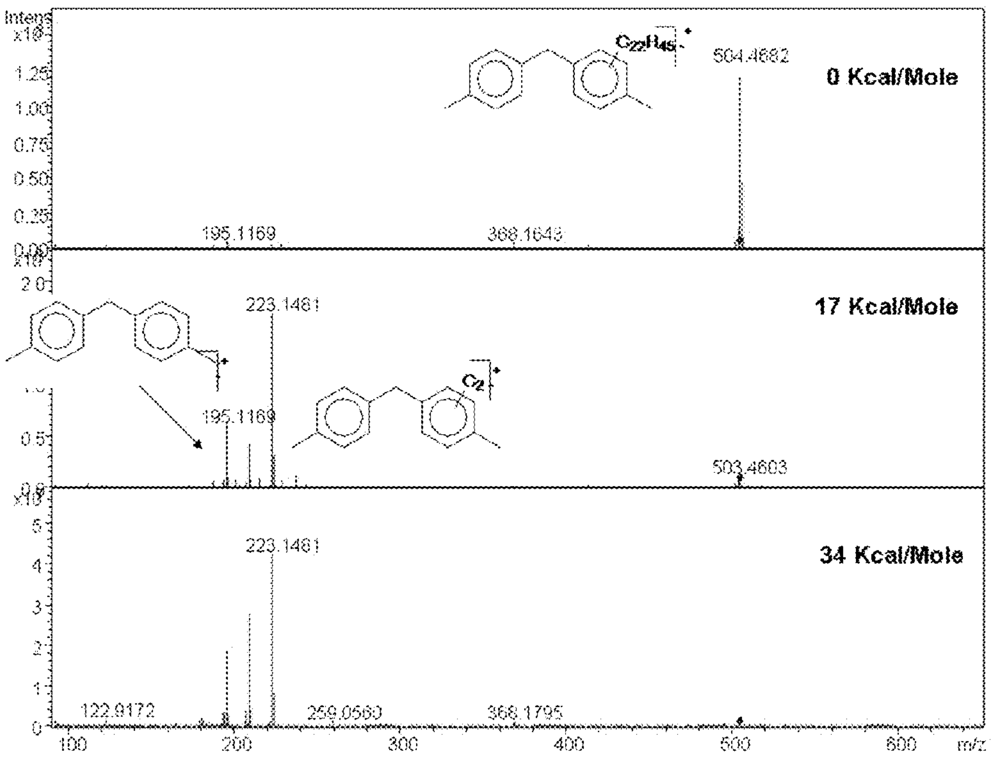
FIG. 12 shows CID of C22 Alkylated p-Di-Tolyl Methane.
Figure 13:
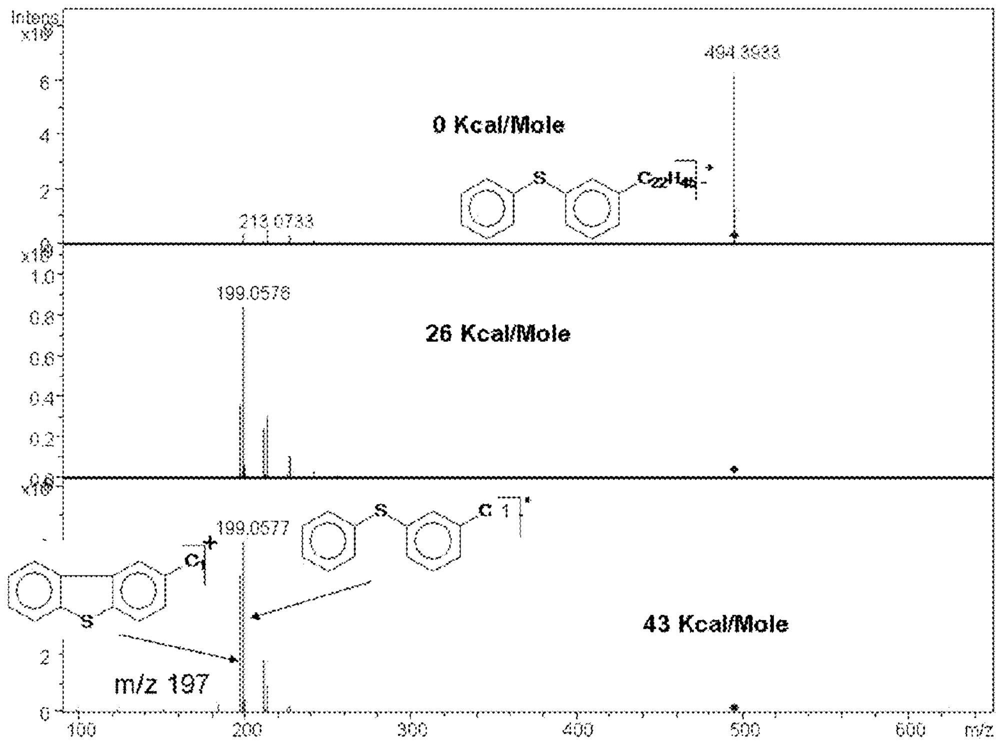
FIG. 13 shows C22 Alkylated Di-Phenyl Sulfide.
Figure 14:
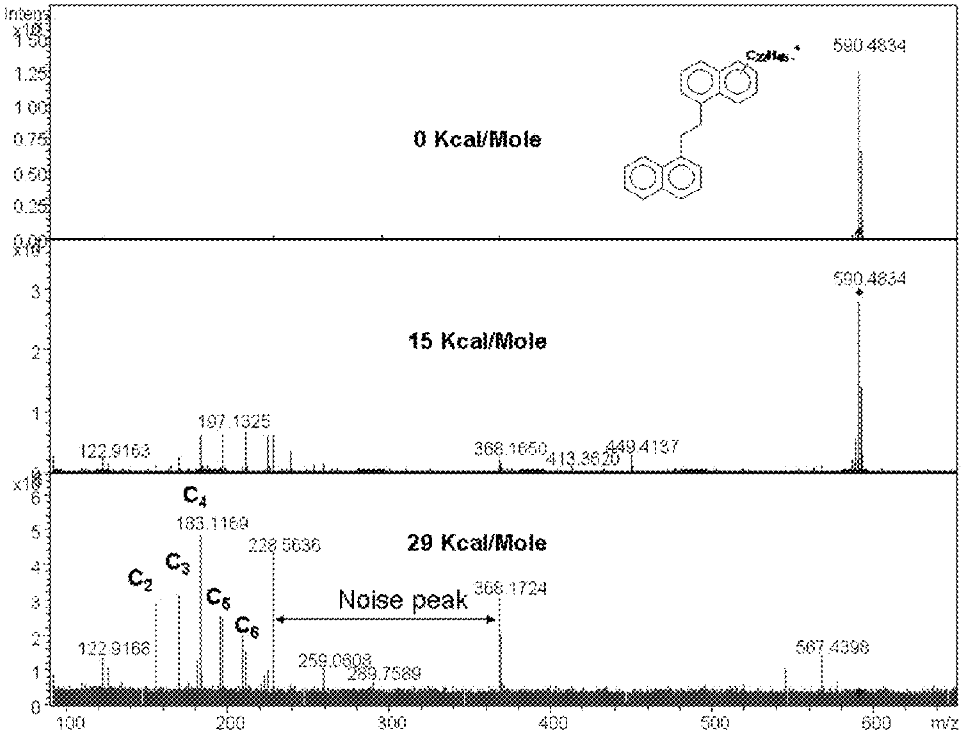
FIG. 14 shows C22 Alkylated Di-Naphthyl Ethane.

We have known that CID process will not break aromatic bond and bi-aryl bond. It is not known if CID will break $C_1$, $C_2$ and aromatic sulfur linkages. FIG. 12 shows the CID of $C_{22}$-Toluene-$C_1$-Toluene ($C_{22}$ Alkylated p-Di-Tolyl Methane). It is clear that CID does not break C1 bond as evidenced by the lack of any alkyl toluene products. FIG. 13 shows the CID of $C_{22}$-Benzene-S-Benzene ($C_{22}$ Alkylated Di-Phenyl Sulfide), again we observed mostly $C_1$ and $C_2$ diphenyl sulfides. There is no evidence of broken of sulfide linkage. At high collision energy, we observed closure of the two phenyl groups and formation of $C_1$ and $C_2$ dibenzothiophenes. This reaction can have adverse impact on the interpretation of CID data as aromatic sulfide will contribute to the DBT formation. The CID of $C_2$ linkage is illustrated in FIG. 14. At mild collision energy (29 kcal/mol), the molecule is breaking down into $C_2$ to $C_6$ naphthalenes. Thus $C_2$ bond is a weak linkage that can be easily broken down by CID. It is expected that any longer alkyl linkage will break at even lower collision energies.

Impact on Naphthenic Ring

Figure 16:
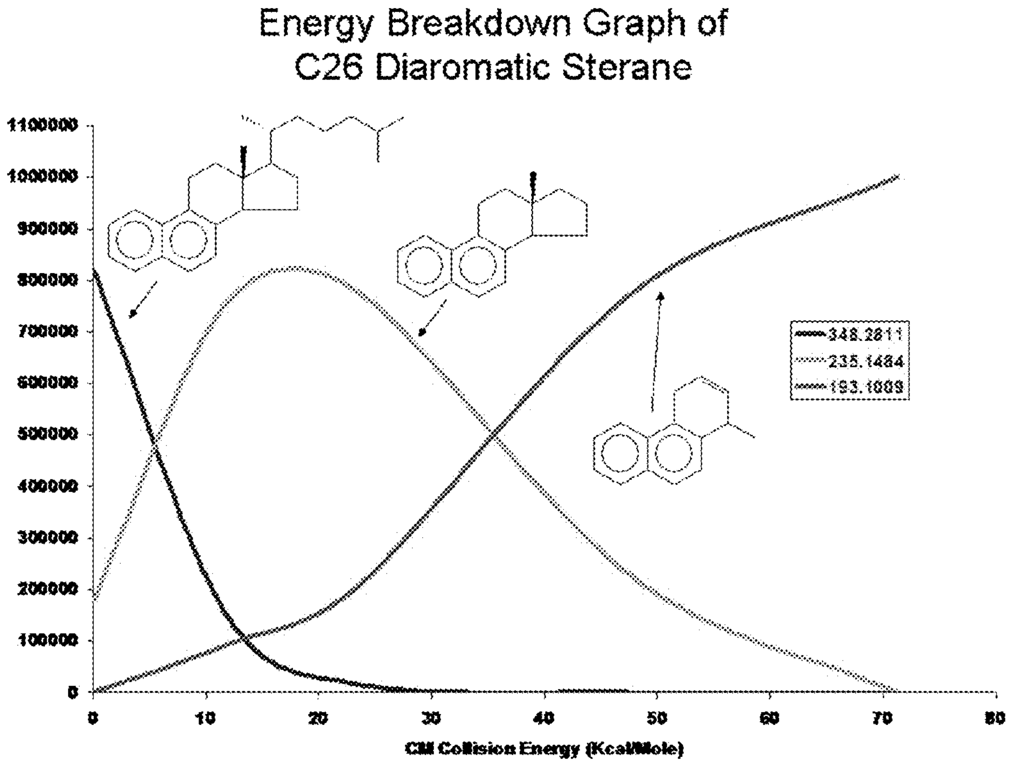
FIG. 16 shows Energy Breakdown Curve of C26 Diaromatic Sterane.

One important question about CID is its impact on naphthenic ring structures. The model compound tested here is a $C_9$ alkyl diaromatic sterane containing both 5 and 6 member ring naphthenic structures. As shown in FIG. 15, at 24 kcal/mol energy, the major product ion has m/z of 235 which is consistent with a $C_1$ diaromatic sterane. The 9 member ring structure that may be a more stable product ion. At very high collision energy (71 kcal/mol), we observed clear evidence of ring opening and formation of cyclic olefin aromatic structure. Interestingly the Z number is still conserved even if the core structure has changed. This implies that we may use Z-number to represent naphthenic structure as it the sum of total number of ring plus double bonds. It should be noted that high energy does induce aromatization of the molecules as indicated by the formation phenanthrene at high collision energy. FIG. 16 shows the energy breakdown curve of the major product ions. Ring structure is preserved across a wide range of collision energy. However, ring opening product become dominant after 40 kcal/mol.

CID of Petroleum Fractions

Factors Affecting CID Product Distribution

CID of petroleum fraction is more complicated than that of model compounds. In addition to collision energy, a number of factors have been found affecting CID product distribution primarily caused by MSAD effect as explained in the overview of CID fundamentals. The effect of MSAD is more pronounced in the CID of petroleum sample because there are much more ions in the collision cell and much higher charge density compared to model compound experiments. Consequently, fragmentation pattern are affected by ion accumulation time and concentrations of the samples. Ions are delivered into ICR cell using a series of static lenses. Molecular weight distribution has been found affected by beam steering voltage, flight time from steering lens to the cell and ICR excitation energy. For modeling purpose, it is critical to have a set of conditions that will produce consistent fragmentation pattern. For vacuum resid samples, collision energy is set at 30 eV. Vacuum resid molecules ionized by APPI have a molecular weight range from 400 to 1200 Da and peaks around 700 Da. This translates into an average CM collision energy of about 37 kcal/mol. Based on model compound study, this energy should convert most of the molecules into C1 to C3 substituted cores. VGO molecules ionized by APPI have an average molecular weight about 450 Da. To get similar CM collision energy, lab energy is set at 20 eV for CID of VGO samples.

Quality Assurance of CID Data

For all VR DAO fractions, concentrations of the samples are prepared at ~2 mg/10 cc (~200 ppm W/V). Sample Infusion flow rate is maintained at 120 μL/hour. Since asphaltene samples have poor sensitivity, these samples are prepared at higher concentrations (~500 ppm) and higher infusion flow rate (~600 μL). Collision cell accumulation time is between 0.5 to 2 sec. Excitation energy (RF attenuation) is set to 14 to 20 to enhance low m/z detection. DOBA ARC4 fraction is used to monitor the fragmentation consistency as shown in FIG. 17. The example covers a six week span. The resulting bimodal distribution is expected with the low mass distribution to be approximately half the intensity of the higher mass distribution. The separation mass for the two distributions is around m/z 229. Overall intensity is expected to be around $4\times10^7$.

Multi-Core Structures in Vacuum Resids

Our first set of CID experiments was performed on DOBA aromatic ring class fractions. FIG. 18 shows the changes in molecular weight distribution and z-number distribution before and after CID of a DOBA ARC4 fraction. The reduction in molecular weight is expected due to de-alkylations of VR molecules. The most interesting results are in z-number distribution where we observed a bimodal distribution. The distribution between Z=−6 and −20 are small aromatic molecules with 1 to 3 aromatic rings. The distribution after Z=−20 are more condensed aromatic structures (4 to 9 ring aromatics). This data confirmed multi-core structure concept and presence of highly condensed and small aromatic building blocks in vacuum resid. FIG. 19 reveals the 2 dimensional plots (Z and MW) of DOBA ARC1 to ARC4 before and after CID. Negative Z and MW reduction were observed for all fractions. Molecules were effectively reduced to their core structures by CID. Multi-core feature is more visible in ARC4+ fraction.

Comparison of CID Products Between VR and VGO

Figure 20:
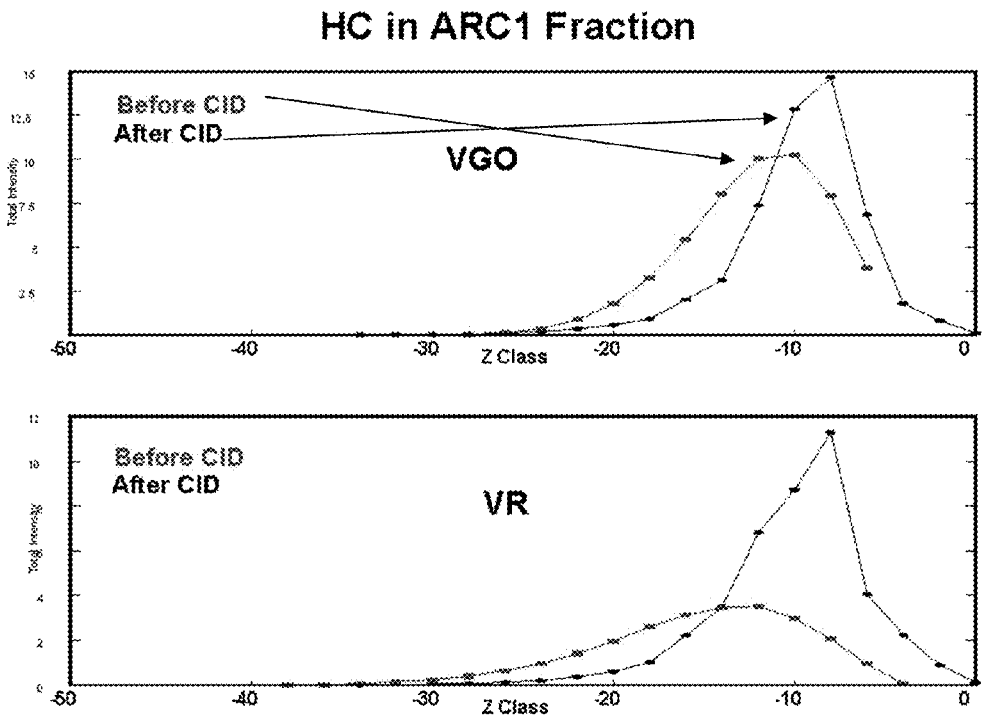
FIG. 20 shows Z-Distribution of Hydrocarbons in DOBA VGO and VR ARC1 Fractions Before and After CID.

Since composition and structure of petroleum molecules in vacuum gas oil range have been well characterized under the framework of HDHA, it is useful to compare CID of VGO and VR. FIG. 20 shows the CID of DOBA ARC1 fractions. Before CID, VR is notably different from VGO, VR has a wider z-distribution (−6 to −30) than does VGO (−6 to −24). After CID both z-distributions are reduced to 0 to −24. Note the low Z limit (−24) of VGO did not change before and after CID, suggesting that CID does not promote condensation reaction. The CID product distributions are similar between VGO and VR, implying that they may be made up of a similar set of single core molecules. The most abundant product has a z-number of −8 which could be styrene, indane or tetralin. VR showed somewhat higher levels of Z=−12 species which could be due to the presence of naphthalene cores.

Figure 21:
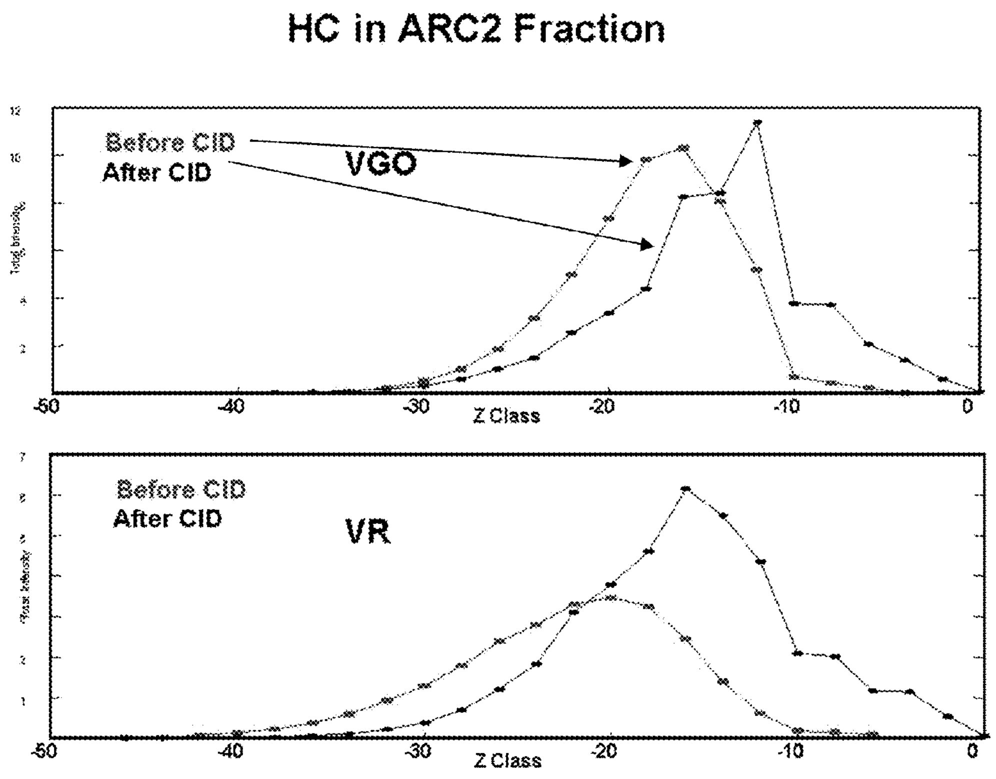
FIG. 21 shows Z-Distribution of Hydrocarbons in DOBA VGO and VR ARC2 Fractions Before and After CID.

FIG. 21 shows CID of DOBA ARC2 fractions. Again before CID, VR has a much wider Z-distribution, −12 to −40 versus −12 to −30 of VGO. After CID, VGO Z-distribution is changed to 0 to −30. Note that the low limit of Z-distribution of VGO is the same before and after CID while that of VR is changed from −40 to −32. The most abundant products are naphthalene and fluorene in VGO and VR, respectively. Low levels of monoaromatics observed in both VGO and VR CID.

Figure 22:
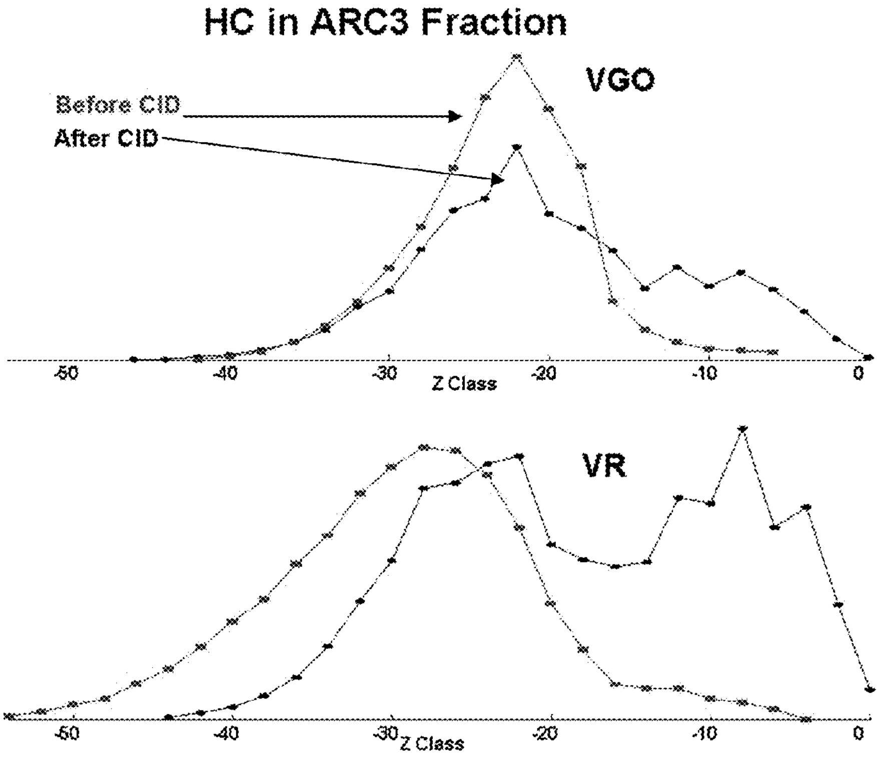
FIG. 22 shows Z-Distribution of Hydrocarbons in DOBA VGO and VR ARC3 Fractions Before and After CID.

FIG. 22 shows CID of DOBA ARC2 fractions. The low limit of Z-distribution of VGO is the same (−40) before and after CID while that of VR is changed from −52 to −42. The abundances of products are visibly different between VGO and VR. Higher levels of 1 and 2 ring aromatics were found in VR CID. VGO also showed some 1 and 2 ring aromatic products. The most abundant species is centered around −20 and −22 which could be acephenanthrenes and fluoranthenes, respectively. Indane is the most abundant small building block in VR. VGO Z-distribution before and after CID are similar in the high Z region (Z<−18), indicating single core natures of VGO. VR showed huge reduction in Z-numbers after CID. Z-distribution shows bimodal feature.

Figure 23:
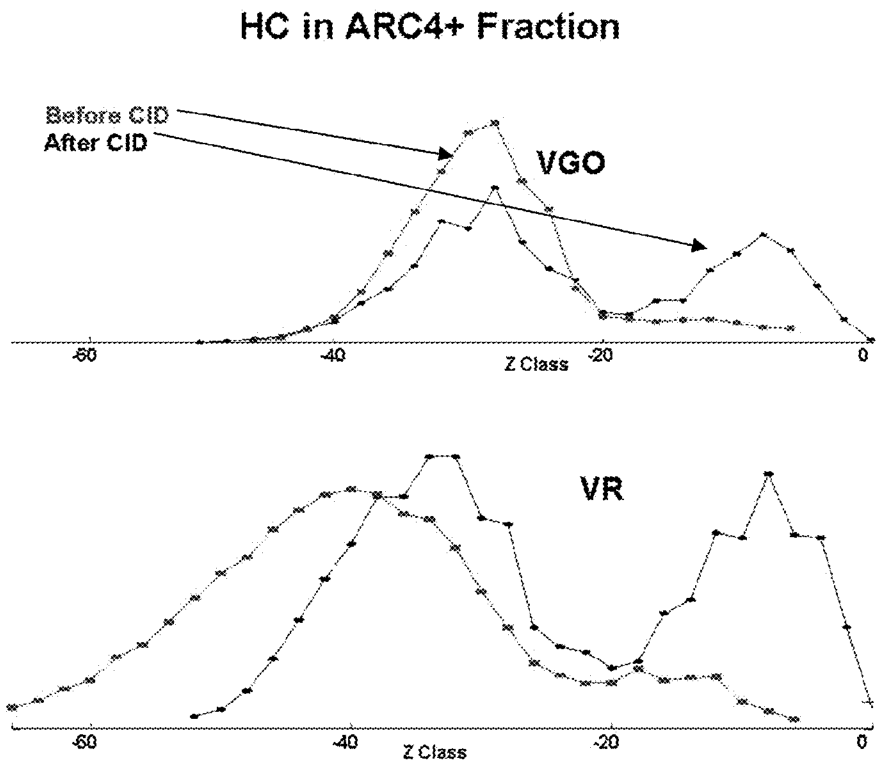
FIG. 23 shows Z-Distribution of Hydrocarbons in DOBA VGO and VR ARC4+ Fractions Before and After CID.

FIG. 23 shows CID of DOBA ARC4+ fractions. Both product distributions are bimodal. VR contains more condensed cores (Z<−40). The most abundant large cores in VGO and VR are benzopyrenes and dibenzopyrenes, respectively. Indane is the most abundant small building block in both VGO and VR. VGO Z-distribution before and after CID are similar in the high Z region (Z<−18). VR showed huge reduction in Z-numbers after CID. Since asphaltene molecules cannot be precipitate out from DOBA via the standard deasphaltene procedure. DOBA ARC4 and Sulfides are expected to contain portions of asphaltene molecules. This explains why CID of DOBA ARC4+ fraction produce compounds with more negative Z-values (which is different from Maya ARC4+ as will be discussed later).

Figure 24:
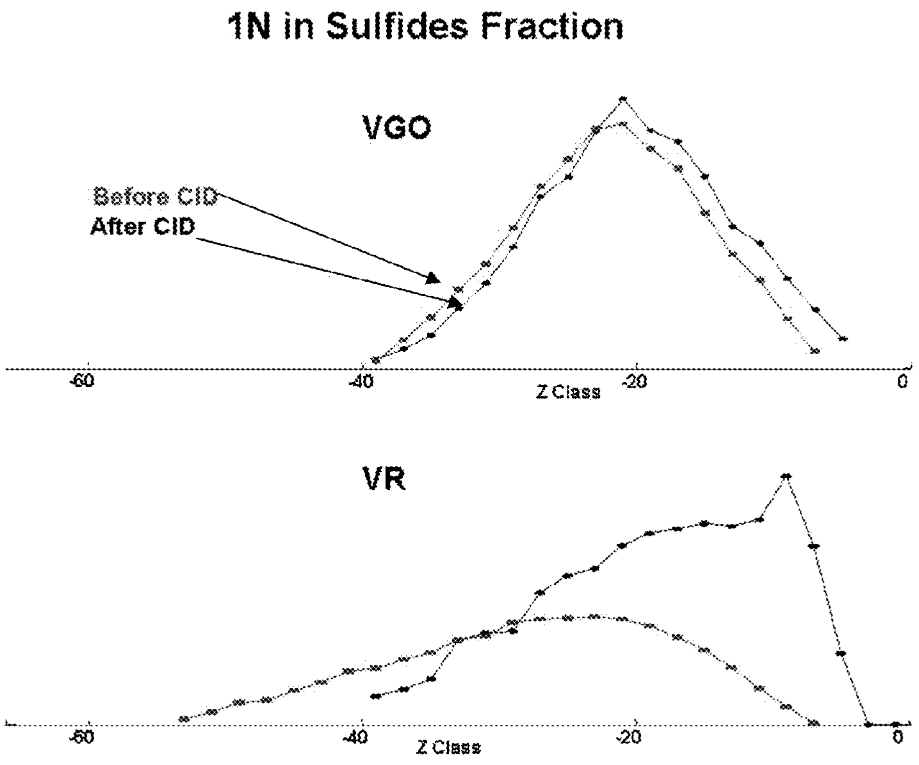
FIG. 24 shows Z-Distribution of 1N Compounds in DOBA VGO and VR Sulfides Fractions Before and After CID.

FIG. 24 shows CID of DOBA sulfides fractions. Since DOBA is a low sulfur crude, sulfides fraction contains most nitrogen compounds. There is a small shift in VGO 1N Z-distributions before and after CID, suggesting only single cores exist in 1N compounds. The z-distribution peaks around −21 which are consistent with 4-ring aromatic nitrogen compound (benzocarbazoles). VR showed huge reduction in Z-numbers after CID. The distribution is bimodal. Average core size in VR is smaller than that in VGO. The most abundant building block is indole indicating nitrogen compounds in VR sulfide fraction are multi-cores.

To further compare VGO and VR structures, we studied a high sulfur and high asphaltene vacuum resid, Maya. The product distribution of ARC1 to 4+ and sulfide fractions are given in FIGS. 25 to 29. It is evident that although abundance is different, the range of Z-distributions between VGO and VR is very similar, including ARC4+ and sulfide fractions. This is mainly due to the fact that asphaltene molecules have been removed from these fractions in the de-asphaltene process.

Figure 25:
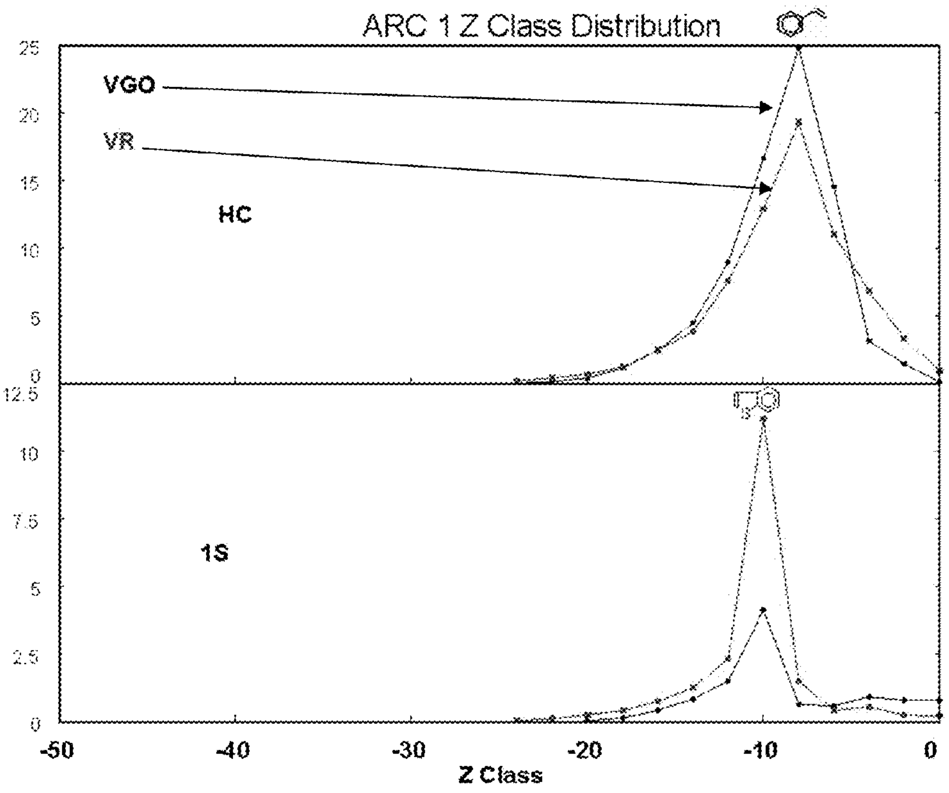
FIG. 25 shows Z-Distribution of Hydrocarbons and 1S Compounds in Maya VGO and VR ARC1 Fractions After CID.
Figure 26:
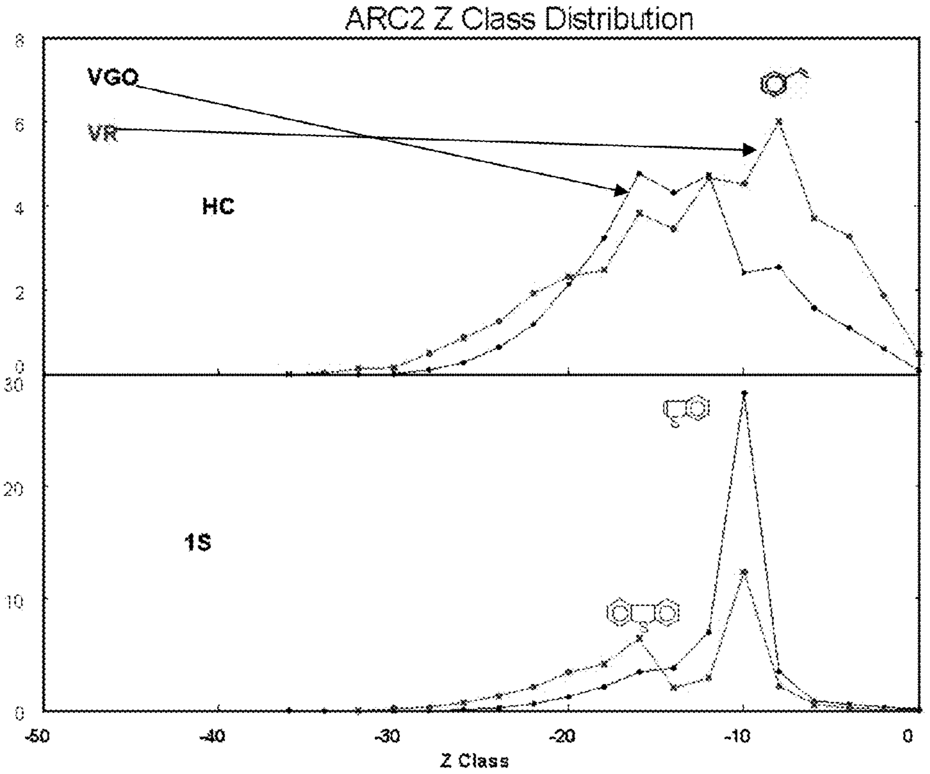
FIG. 26 shows Z-Distribution of Hydrocarbons and 1S Compounds in Maya VGO and VR ARC2 Fractions After CID.
Figure 27:
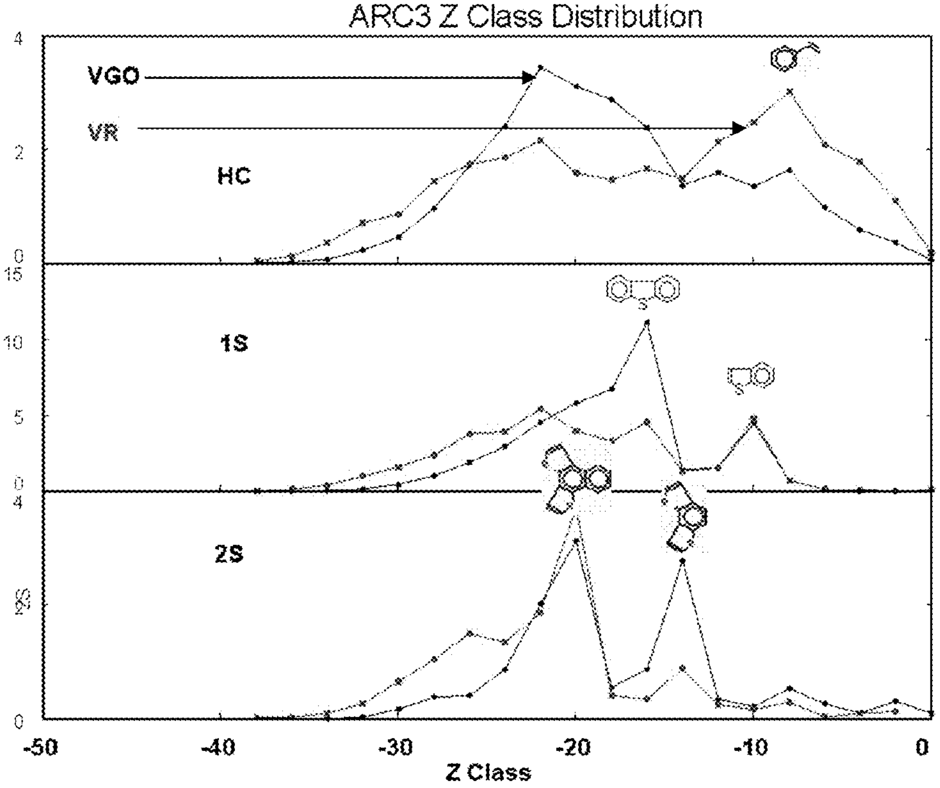
FIG. 27 shows Z-Distribution of Hydrocarbons, 1 and 2S Compounds in Maya VGO and VR ARC3 Fractions After CID.
Figure 28:
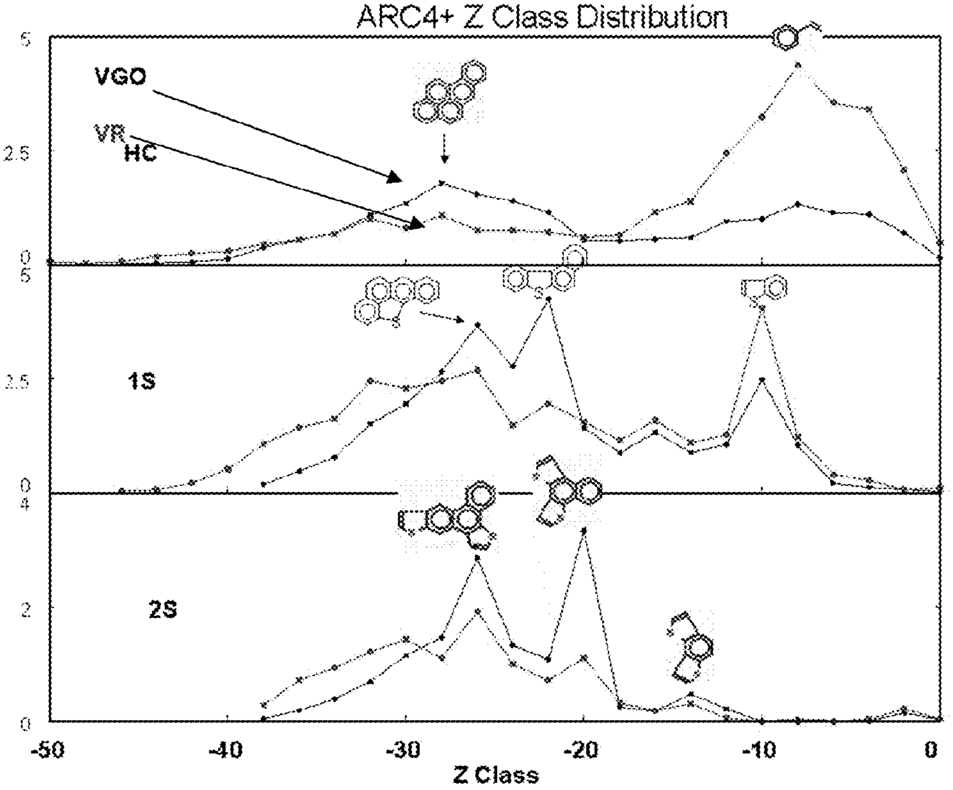
FIG. 28 shows Z-Distribution of Hydrocarbons, 1 and 2S Compounds in Maya VGO and VR ARC4+ Fractions After CID.
Figure 29:
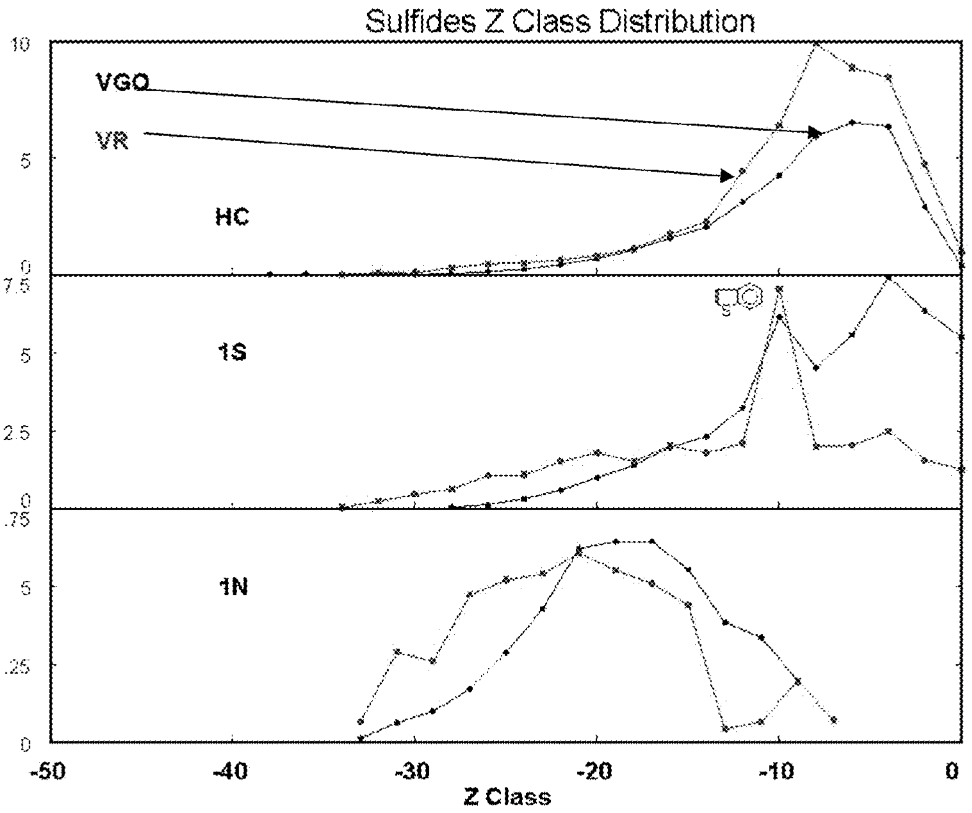
FIG. 29 shows Z-Distribution of Hydrocarbons, 1S and 1N Compounds in Maya VGO and VR Sulfides Fractions After CID.

CID of Maya ARC 1 fractions produce benzene, naphtheno benzene and dinaphtheno benzene as the most abundant hydrocarbon cores (FIG. 25). The most abundant sulfur cores are benzothiophenes. VR yields more benzothiophenes than VGO, implying that ring class separation is less perfect in VR. CID of Maya ARC2 fractions produce mostly biphenyl, naphthalene and fluorene as the most abundant hydrocarbon cores (FIG. 26). The most abundant sulfur cores are still benzothiophenes. However, VR also produces more dibenzothiophenes. Note that VR produce higher levels of naphtheno benzenes than VGO, a clear indication of multi-core structures. CID of Maya ARC3 fractions produce hydrocarbon, mono-sulfur and di-sulfur cores. (FIG. 27). Although Z-distribution range is the same for VGO and VR. The distributions are clearly different. VR yields more condensed building blocks (with high negative Z-values). The same trend holds true for ARC4+ (FIG. 28) and sulfide fractions (FIG. 29). The major difference between DOBA and Maya ARC4+ and Sulfides is that DOBA has more condensed structures. The low Z-limit for DOBA and Maya VR ARC4+ are −52 and −44, respectively. Another interesting observation is that Maya VR sulfides 1N did not show high levels of indole feature as did the DOBA fractions, suggesting that Maya sulfides contains less multi-cores than Doba.

Overall, our conclusion is that DAO fractions are made of core types that are existing in vacuum gas oils. ARC4+ fractions of VGO may also contain multi-cores but at much lower abundance.

CID of Asphaltenes

Figure 30:
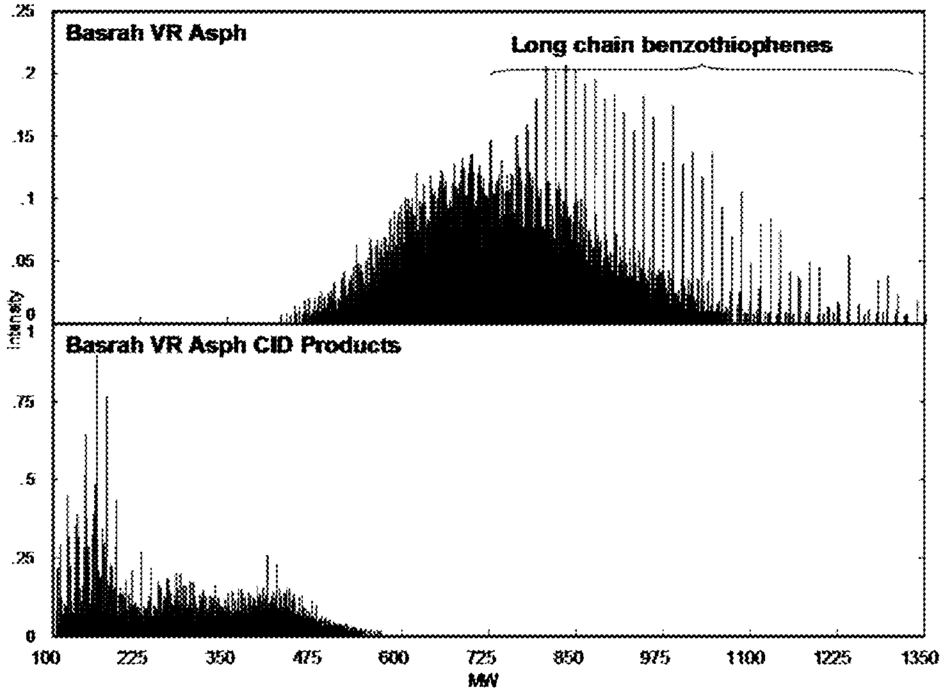
FIG. 30 shows Molecular Weight Distribution of Basrah VR Asphaltene Before and After CID.

Asphaltene in this work is defined as n-heptane insolubles. VR asphaltene content has a wide range from 0 (e.g. Doba and Rangdong) to 38 percent (e.g. Maya). Asphaltene fraction represents the most complicated portion of petroleum. It is high boiling (~50% molecules have boiling points greater than 1300 F). It contains multi-hetero atoms and various functionalities. FIG. 30 shows mass spectra of Basrah asphaltenes before and after CID. Before CID, upper mass up to 1350 Da were observed. The distinct peaks between 800 to 1350 Da are identified to be alkylated benzothiophenes. These molecules are likely co-precipitated during the de-asphaltene process because of their high wax nature. CID effectively reduced the molecular weight of asphaltene molecules into 100 to 600 Da range.

Figure 31:
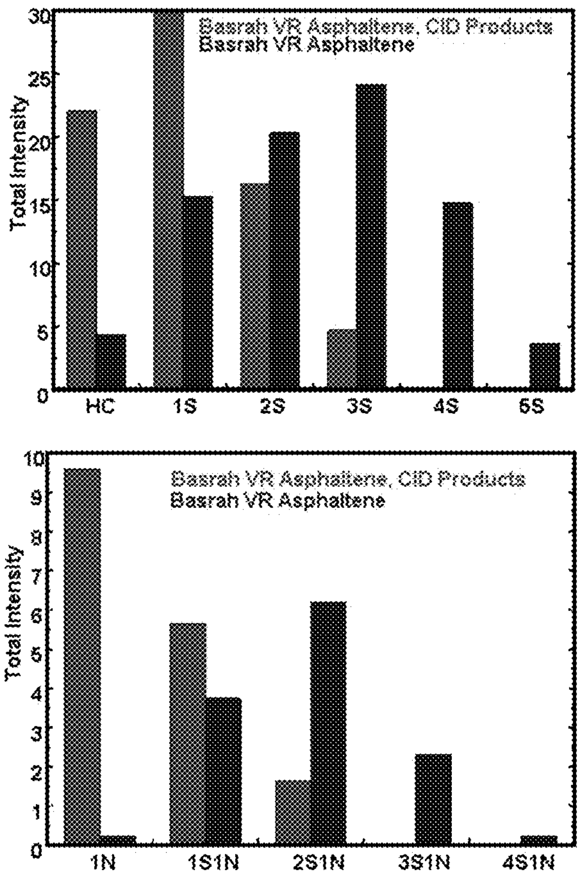
FIG. 31 shows Compound Classes of Basrah VR Asphaltene Before and After CID.
Figure 32:
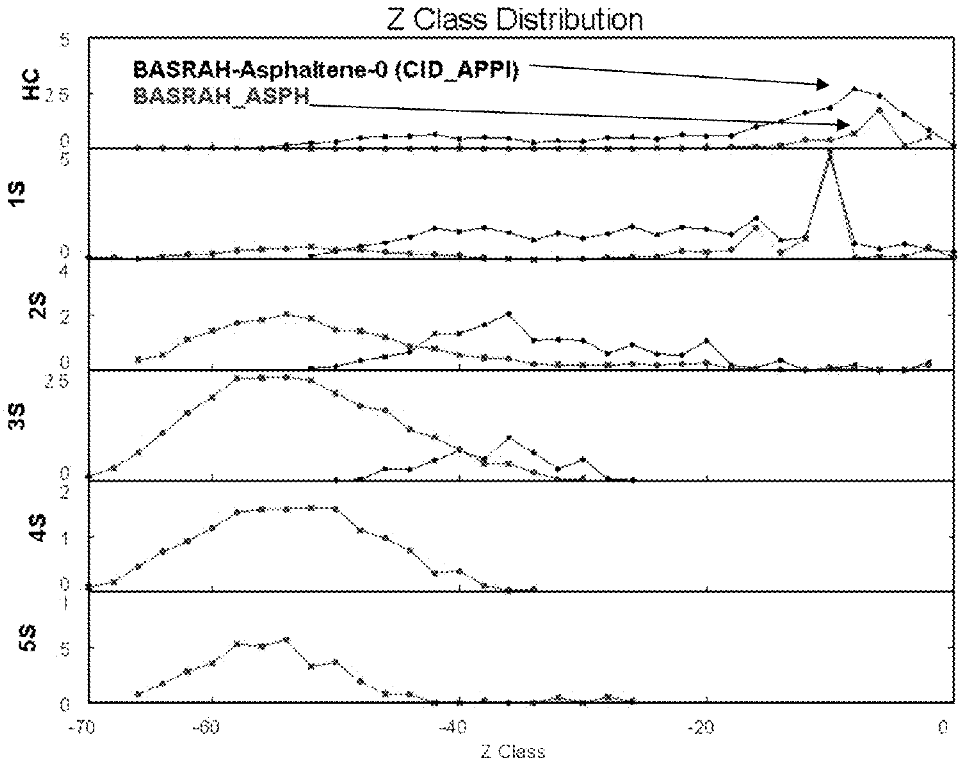
FIG. 32 shows Z-distribution of Basrah VR Asphaltene Before and After CID.
Figure 33:
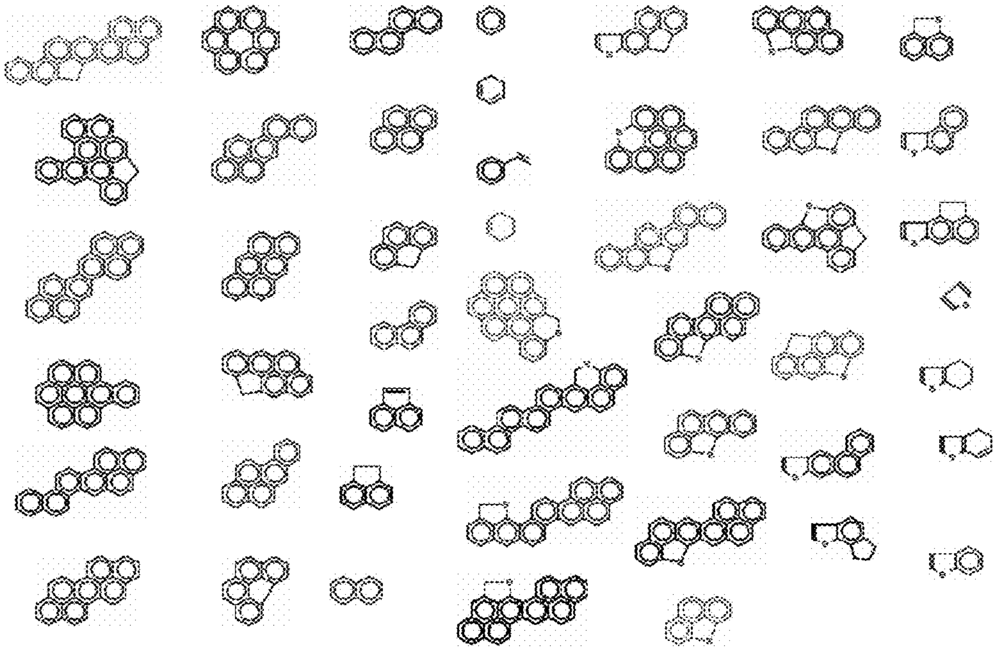
FIG. 33 shows Hydrocarbon and 1S Cores Observed in Asphaltene.
Figure 34:
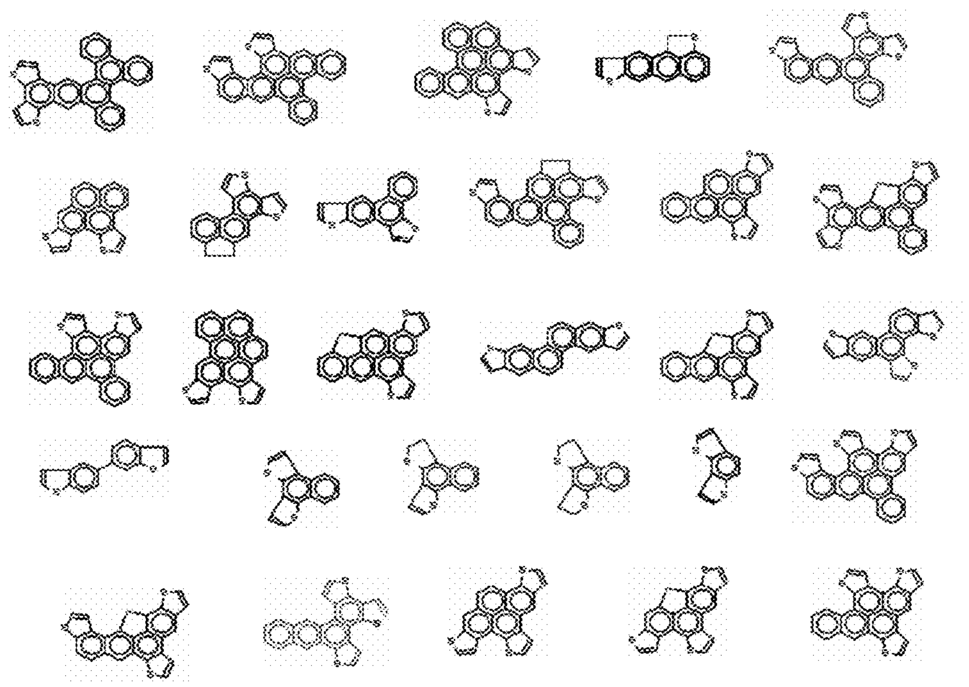
FIG. 34 shows 2S and 3S Cores Observed in Asphaltene.

FIG. 31 illustrates the changes in molecular classes caused by CID. Before CID, VR contains very small amount of hydrocarbon molecules. Most molecules contain 1 to 5 S atoms with 3S species being the most abundant. After CID, the most abundant cores are 1S and hydrocarbon molecules. All 4S and 5S species are completely removed. Most 3S molecules were also removed by CID. The Z-distribution of Basrah asphaltene is shown in FIG. 32. The low limit of Z-distribution is changed from −70 to −52. The large reduction in Z number is a clear indication of multi-core dissociation of asphaltene molecules. Observed asphaltene cores by CID are given in FIGS. 33 and 34.

Comparison of Core Distribution by CID-FTICR-MS and MCR-MHA

Figure 35:
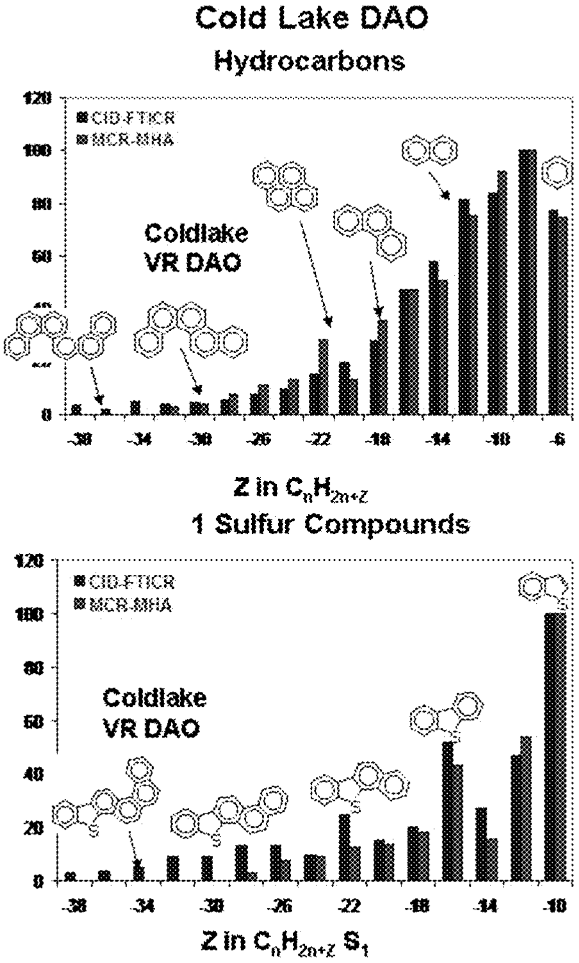
FIG. 35 shows A Comparison of DAO Z-Distributions by CID-FTICR-MS and by MCR-MHA.

In late 2005, we conducted a series of thermal experiments on VR DAO and asphaltenes using a prep-scale MCR apparatus. The headspace liquids were collected and analyzed by Micro-Hydrocarbon Analysis[3]. One of the vacuum resids is Cold Lake which is also characterized in this work by CID-FTICR technique. To compare the results of the two characterizations, we combined CID-FTICR data by the weight of ARC and Sulfide fractions. Only aromatic compounds are compared as APPI cannot ionize saturate molecules. The MHA data of DAO liquid are lumped by their Z-distribution. The two data sets were compared in FIG. 35. Overall the two distributions look similar, implying that CID is thermal in nature. However, due to the lack of bi-molecule reactions, coking (aromatic condensation) does not happen in CID process. CID showed aromatic core size in DAO not exceeding six. The fact that MHA did not detect >5 ring aromatics is mostly due to volatility limitation of the GC.

Figure 36:
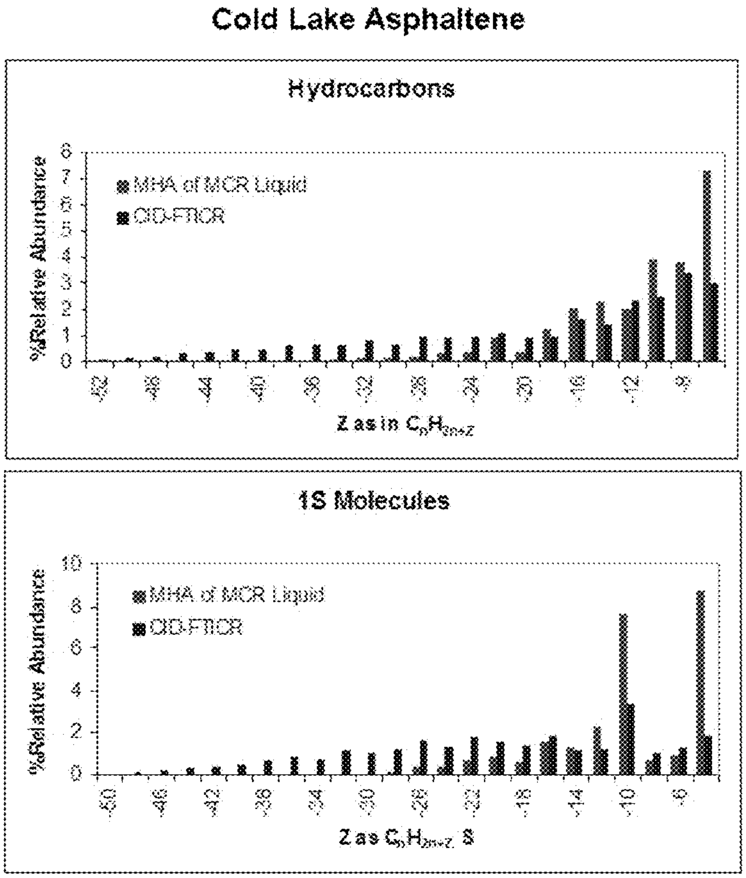
FIG. 36 shows Comparison of Asphaltene Z-Distributions by CID-FTICR-MS and by MCR-MHA.

A comparison of CID-FTICR and MCR-MHA of Cold Lake asphaltene fractions are shown in FIG. 36. The differences between the two are much more pronounced. Basically, CID detects much more polyaromatic structures (−32 to −50) that are absent in MHA analysis of MCR liquid. In MCR experiments, these large PNAs likely end up in coke. In addition, GC's temperature limitation also prevents the detection of these condensed aromatics by MHA. The data demonstrates the advantages of CID for core structure speciation.

CONCLUSIONS

The presentation uses CID-FTICR-MS technology to determine structures of vacuum resid. The multi-core nature of vacuum resid is confirmed. Multi-core features are more pronounced in higher aromatic ring classes and asphaltene fractions. A wide range of model compounds were synthesized to understand CID chemistry and interpretation of resid composition. Model compound experiments demonstrated de-alkylation of single core structures and conservation of Z-number (or core structures). 35 to 40 kcal/mol of center of mass collision energy allows de-alkylation of resid molecules to C1-C4 substituted cores. Hetero-core types were studied to evaluate relative efficiency in core production. In general, Steven's rule applies to the process. The core that has lower ionization potential is more likely to carry charges. C1 and aromatic sulfide bond cannot be broken by CID while C2 linkages can be easily broken. Naphthenic ring opening and addition of an olefin bond has been observed. However, Z-number is conserved in the process. Aromatic ring closure was observed for aromatic sulfide which may cause overestimate of thiophenes, benzothiophenes and dibenzothiophenes when interpreting CID results of sulfide fractions.

Vacuum resid and vacuum gas oil fractions were characterized in parallel to understand the structures of vacuum resid. CID of DAO fractions yield products that have similar Z range as did VGO although abundances of the cores are different. This result implies that DAO fractions are made of cores that are existing in VGO. CID of DOBA ARC4+ and Sulfides generates product that has Z-range very different from VGO, mainly because DOBA cannot be de-asphaltened by n-heptane. Thus ARC4+ and sulfide fractions likely contain more condensed structures. CID of asphaltene fractions yields polarized Z-distributions. Namely, both condensed and light aromatic building blocks were observed. The Z-numbers of −52 imply up to 8 aromatic rings structures that cannot be further decomposed by CID.

The results from CID-FTICR-MS experiments were compared with the composition derived from micro-hydrocarbon analysis (MHA) of MCR liquid from Cold Lake vacuum resid. The Z-distributions of DAO between the two experiments are very similar, indicating CID chemistry has similarities to thermal chemistry. The results on asphaltene are very different, CID-FTICR-MS sees much more condensed aromatic structures while MHA-MCR only see aromatics up to 6 aromatic rings. The differences are partially due to the boiling point limitation of GC. In addition, CID process does not form coke and thus provides a more complete picture on the core distributions.

TABLE 2

MODEL COMPOUNDS FOR CID STUDIES

| Model Compound | Purity | Core Type | Purpose |
|---|---|---|---|
| di-C16 Alkylated Naphthalene | Pure | single | Dealkylation |
| binaphthyl tetradecane | Mixture | 2-Core | Alkyl linkages |
| C22 Alkylated Di-Naphthyl Ethane | Mixture | 2-Core | C2 Linkages |
| C22 Alkylated p-Di-Tolyl Methane | Mixture | 2-Core | C1 Linkages |

TABLE 2-continued

MODEL COMPOUNDS FOR CID STUDIES

| Model Compound | Purity | Core Type | Purpose |
|---|---|---|---|
| C22 Alkylated Di-Phenyl Sulfide | Mixture | 2-Core | Aromatic Sulfide Linkage |
| Naphthalene-tetradecane-Pyrene | Mixture | 2-Core | Core Response: 2 vs 4 Ring Arom |
| DBT-tetradecane-Phenanthrene | Mixture | 2-Core | Core Response: Sulfur Effect |
| Carbazole-tetradecane-Phenanthrene | Mixture | 2-Core | Core Response Factor: Nitrogen Effect |
| C26 Diaromatic Sterane | Pure | single | Ring opening |
| Pyrene-decahydronaphthalene | Mixture | 2-Core | Ring opening and Core Response: Arom vs Naph |
| Hydrogenated C22 Alkylated Chrysene | Mixture | single | Ring opening |

TABLE 3

PETROLEUM FRACTIONS CHARACTERIZED BY CID-FTICR MS

| | Lab Collision Energy |
|---|---|
| Vacuum Gas Oil Fractions | |
| COLD LAKE BLEND | 20 V |
| DOBA BLEND | 20 V |
| MAYA | 20 V |
| VR Fractions | |
| BASRAH | 30 V |
| COLD LAKE BLEND | 30 V |
| DOBA BLEND | 30 V |
| MAYA | 30 V |

REFERENCES

1. Brown, James M.; Sundaram, Anantha; Saeger, Roland B.; Wellons, Helen S.; Kennedy, Clinton R.; Jaffe, Stephen B. Estimating compositional information from limited analytical data. PCT Int. Appl. (2009), 96 pp. CODEN: PIXXD2 WO 2009051742 A1 20090423 CAN 150:451539 AN 2009:493231
2. Qian, K.; Dechert, G. J., Recent Advances in Petroleum Characterization by GC Field Ionization Time-of-Flight High-Resolution Mass Spectrometry. *Analytical Chemistry* 2002, 74, (16), 3977-3983.
3. Qian, Kuangnan; Edwards, Kathleen E.; Dechert, Gary J.; Jaffe, Stephen B.; Green, Larry A.; Olmstead, William N. Distributed total acid number in petroleum and petroleum fractions by electrospray mass spectrometry. U.S. Pat. No. 7,723,115, 20 pp. CODEN: USXXCO US 2007037288 A120070215 CAN 146:232304 AN 2007:175588
4. Chawla, Birbal; Green, Larry A. HPLC separation and quantitation of heavy petroleum fractions. PCT Int. Appl. (2010), 41 pp. CODEN: PIXXD2 WO 2010114587 A1 20101007 CAN 153:485056 AN 2010:1252505
5. Chawla, Birbal; Green, Larry A. Multi-dimensional HPLC separation technique (star7) for quantitative determinations of 7 fractions in heavy petroleum streams boiling above 550 F. U.S. Pat. Appl. Publ. (2010), 21 pp. CODEN: USXXCO US 2010218585 A120100902 CAN 153:363112 AN 2010:1103985
6. F. McLafferty "Interpretation of Mass Spectra", 4th Ed., University Science Books, 1993
7. Laskin J, and J H Futrell. "Activation of Large Ions in FT-ICR Mass Spectrometry." Mass Spectrometry Reviews 24(2):135-167, 2005.
8 Pan, Chongle; Hettich, Robert L. Multipole-Storage-Assisted Dissociation for the Characterization of Large Proteins and Simple Protein Mixtures by ESI-FTICR-MS. Analytical Chemistry (2005), 77(10), 3072-3082.

What is claimed is:

1. A method to determine cores in a petroleum vacuum resid which has molecules with aromatic cores, comprising a. ionizing softly said vacuum resid to form molecular ions and pseudo molecular ions having a molecular weight of at least 400 Daltons, and b. fragmenting the ions within a mass spectrometer by collision induced dissociation using collision energies in the range of 20 to 40 kcal/mole and ion concentrations in collision cells and other instrument parameters to break only aliphatic bonds including heteroatoms of said ions to generate substantially C1 to C3 substituted aromatic cores.

2. The method of claim 1 further comprising the step of organizing said fragments in Z-number or double bond equivalent (DBE) distribution or homologous distribution to determine Z-number distribution by summing abundances of said fragments of the same Z-number wherein Z numbers are assigned to structures and said structures constitute the cores.

3. The method of claim 1 further comprising the step of reconstructing molecular structures of said heavy petroleums and hydrocarbon resources by statistical assembling said structures or building blocks.

4. The method of claim 1 wherein controlled fragmentation is enhanced by multipole storage assisted dissociation.

5. The method of claim 1 where controlled fragmentation is performed by infrared multiphoton dissociation.

6. The method of claim 1 wherein controlled fragmentation occurs either in collision cell or in the cell of ion cyclotron resonance mass spectrometer.

7. The method of claim 1 wherein aromatic-aromatic carbon bonds, aromatic-aliphatic carbon bonds and aromatic carbon-heteroatom bonds of said ions remain unbroken.

8. The method of claim 1 wherein bonds with bond energy less than about 95 kcal/mol are broken.

9. The method of claim 1 wherein said heavy hydrocarbons is a vacuum resid or vacuum gas oil or petroleum distillates with a similar boiling range.

10. The method of claim 1 wherein said ionization step is a soft ionization where molecular ion or pseudo molecular ion structures remain intact.

11. The method of claim 1 wherein said ionization step is performed by electrospray ionization.

12. The method of claim 1 wherein said ionization step is performed by atmospheric pressure chemical ionization.

13. The method of claim 1 wherein said ionization step is performed by atmospheric pressure photoionization (or photon ionization).

14. The method of claim 1 wherein said ionization step is performed by matrix assisted laser desorption ionization.

15. The method of claim 1 wherein said ionization step is performed by direct laser desorption ionization.

16. The method of claim 1 wherein said ionization step is performed by field desorption ionization.

17. The method of claim 3 wherein the molecules are arranged by the number of building blocks they contain.

18. The method of claim 3 wherein the molecules are classified as saturates, aromatics, polars, sulfides, asphaltenes, and metal containing molecules.

19. The method of claim 1 in which the vacuum resid is softly ionized to form molecular ions and pseudo molecular ions having a molecular weight of 400 to 1350 Daltons.

20. The method of claim 1 in which the vacuum resid is softly ionized to form molecular ions and pseudo molecular ions having a molecular weight of 400 to 1200 Daltons.

* * * * *